(12) United States Patent
Yamamoto et al.

(10) Patent No.: US 11,765,294 B2
(45) Date of Patent: Sep. 19, 2023

(54) IMAGE READING APPARATUS, IMAGE READING SYSTEM, AND METHOD FOR CONTROLLING IMAGE READING APPARATUS

(71) Applicant: SEIKO EPSON CORPORATION, Tokyo (JP)

(72) Inventors: Yasuhisa Yamamoto, Kitakyushu (JP); Takayuki Shiota, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/165,727

(22) Filed: Feb. 7, 2023

(65) Prior Publication Data

US 2023/0254425 A1 Aug. 10, 2023

(30) Foreign Application Priority Data

Feb. 8, 2022 (JP) .............................. JP2022-017715

(51) Int. Cl.
*H04N 1/08* (2006.01)
*H04N 1/00* (2006.01)
*H04N 1/387* (2006.01)
*H04N 1/40* (2006.01)

(52) U.S. Cl.
CPC ..... *H04N 1/00816* (2013.01); *H04N 1/00809* (2013.01); *H04N 1/00811* (2013.01); *H04N 1/3878* (2013.01); *H04N 1/40068* (2013.01)

(58) Field of Classification Search
CPC .......... H04N 1/00816; H04N 1/00811; H04N 1/00809
See application file for complete search history.

(56) References Cited

U.S. PATENT DOCUMENTS

2009/0231639 A1* 9/2009 Iwayama ............. H04N 1/3873
358/488
2019/0222710 A1* 7/2019 Motoyama ........... H04N 1/1043

FOREIGN PATENT DOCUMENTS

JP 2009-218953 A 9/2009

* cited by examiner

*Primary Examiner* — Ibrahim Siddo
(74) *Attorney, Agent, or Firm* — WORKMAN NYDEGGER

(57) ABSTRACT

An image reading apparatus acquires first control data regarding generation of first rectangular image data that includes a whole of a document area corresponding to a document within a reading area of read image data. The image reading apparatus acquires second control data regarding generation of second rectangular image data that does not include a background area not corresponding to the document within the reading area of the read image data and includes at least a part of the document area.

10 Claims, 9 Drawing Sheets

IMAGE READING APPARATUS, IMAGE READING SYSTEM, AND METHOD FOR CONTROLLING IMAGE READING APPARATUS

The present application is based on, and claims priority from JP Application Serial Number 2022-017715, filed Feb. 8, 2022, the disclosure of which is hereby incorporated by reference herein in its entirety.

BACKGROUND

1. Technical Field

Embodiments of the present disclosure relate to an image reading apparatus that reads an image from a document, an image reading system, and a method for controlling an image reading apparatus.

2. Related Art

As an example of an image reading apparatus that reads an image from a document, an apparatus that performs processing of clipping a document area corresponding to a document out of a reading area of read image data is disclosed in JP-A-2009-218953. In particular, image data is acquired such that at least the whole of the document area corresponding to the document will be included so as to ensure that no part of a document image will be missing.

However, in such an image reading apparatus of related art, it could happen that a background area that does not correspond to the document is left at an edge portion of image data when the image data is acquired in such a way as to include the whole of the document area. For this reason, a solution for enhancing user friendliness is awaited.

SUMMARY

An image reading apparatus according to a certain aspect of the present disclosure includes: a reading unit that reads an image from a document; and a control unit that performs control regarding image reading, wherein the control unit is configured to execute first image data generation processing of, based on read image data of the image read by the reading unit, generating first rectangular image data that includes a whole of a document area corresponding to the document within a reading area of the read image data, first rectangular image control processing of acquiring first control data regarding generation of the first rectangular image data, second image data generation processing of, based on the first control data, generating second rectangular image data that does not include a background area not corresponding to the document within the reading area of the read image data and includes at least a part of the document area, and second rectangular image control processing of acquiring second control data regarding generation of the second rectangular image data.

An image reading system according to a certain aspect of the present disclosure includes: a reading unit that reads an image from a document; a control unit that performs control regarding image reading; a display unit that performs image display; and an input unit to which instructions given by a user are configured to be inputted, wherein the control unit is configured to execute first image data generation processing of, based on read image data of the image read by the reading unit, generating first rectangular image data that includes a whole of a document area corresponding to the document within a reading area of the read image data, first rectangular image control processing of acquiring first control data regarding generation of the first rectangular image data, second image data generation processing of, based on the first control data, generating second rectangular image data that does not include a background area not corresponding to the document within the reading area of the read image data and includes at least a part of the document area, second rectangular image control processing of acquiring second control data regarding generation of the second rectangular image data, and display control processing of performing control for causing the display unit to display a second rectangular image that is based on the second rectangular image data, based on an input from input unit, after performing control for causing the display unit to display a first rectangular image that is based on the first rectangular image data.

Also provided as a certain aspect of the present disclosure is a method for controlling an image reading apparatus that includes a reading unit that reads an image from a document. The method includes: generating, based on read image data of the image read by the reading unit, first rectangular image data that includes a whole of a document area corresponding to the document within a reading area of the read image data; acquiring first control data regarding generation of the first rectangular image data; generating, based on the first control data, second rectangular image data that does not include a background area not corresponding to the document within the reading area of the read image data and includes at least a part of the document area; and acquiring second control data regarding generation of the second rectangular image data.

DESCRIPTION OF EXEMPLARY EMBODIMENTS

First Embodiment

An image reading system including an image reading apparatus according to an exemplary embodiment will now be explained.

Configuration of Image Reading System 10

Figure 1:
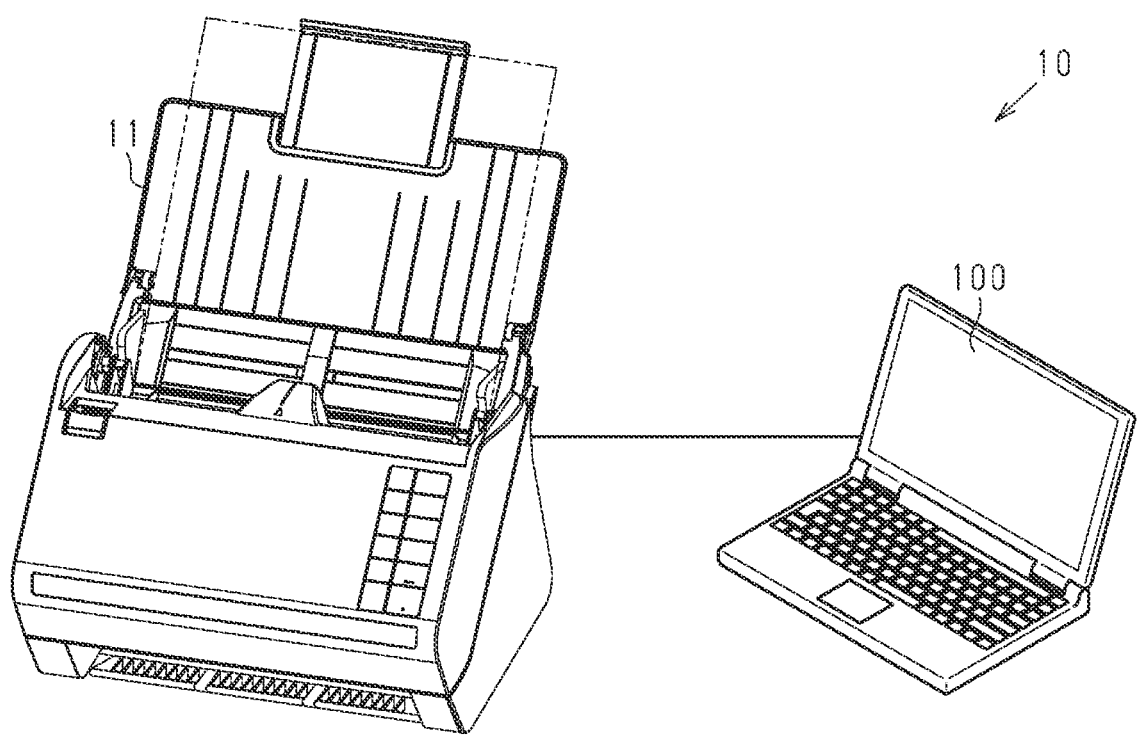
FIG. 1 is a schematic view of an image reading system.

As illustrated in FIG. 1, an image reading system 10 includes an image reading apparatus 11 and a terminal apparatus 100. The image reading apparatus 11 is an apparatus that reads an image from a document. The image reading apparatus 11 is connected to the terminal apparatus 100 such that communication can be performed therebetween.

Configuration of Image Reading Apparatus 11

Figure 2:
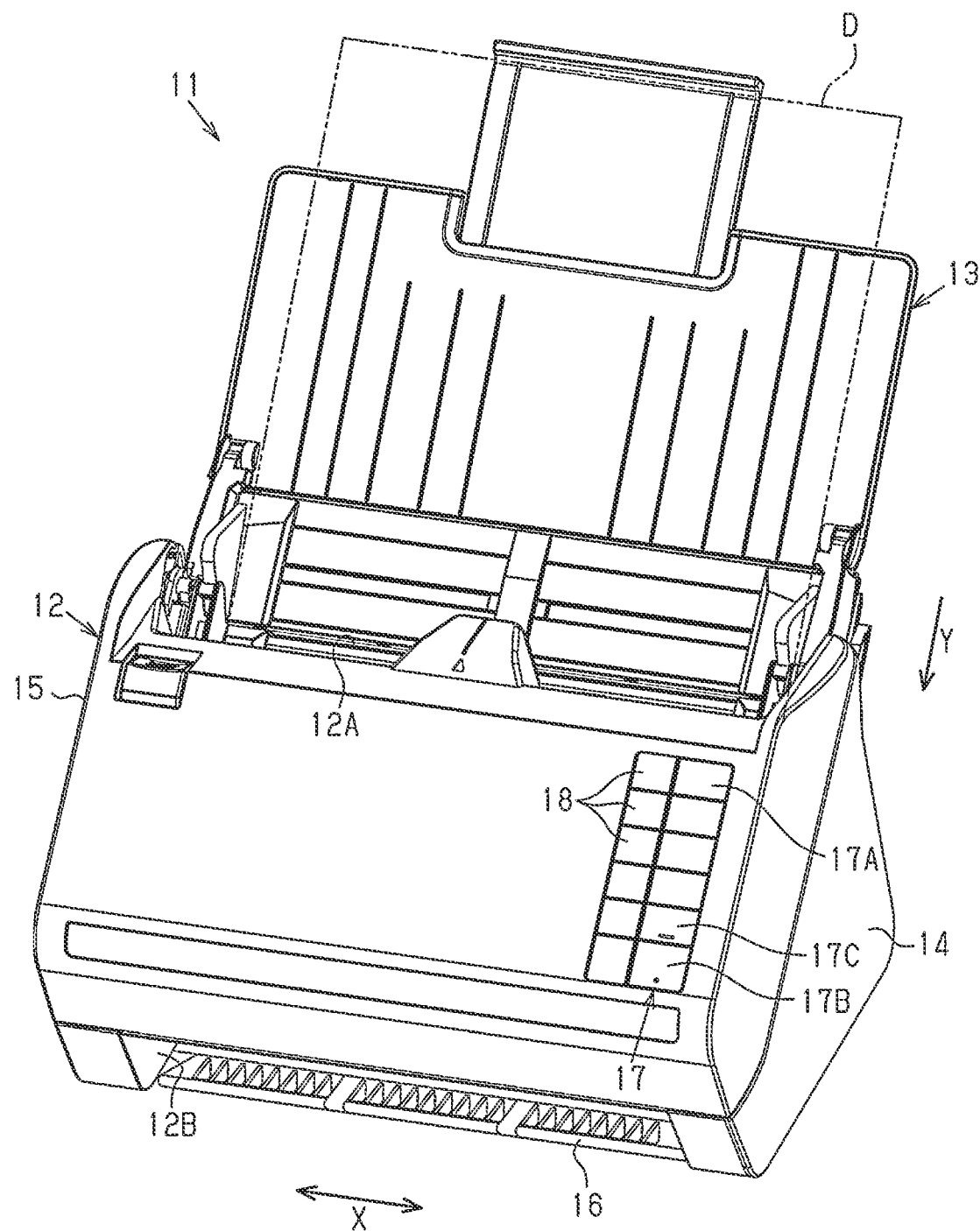
FIG. 2 is a perspective view of an image reading apparatus.

As illustrated in FIG. 2, the image reading apparatus 11 has a body 12. The body 12 may have a substantially trapezoidal shape in a side view. The body 12 has a feeding port 12A formed as an opening at its top. The body 12 has an ejecting port 12B formed as an opening at its front portion near its bottom.

The image reading apparatus 11 may include a document support 13. A document D can be placed on the document support 13. The document D placed on the document support 13 is a document before reading an image. The image reading apparatus 11 is configured such that the document D placed on the document support 13 is fed into the body 12 through the feeding port 12A.

The body 12 includes a body portion 14 and a cover portion 15. The cover portion 15 may be connected to the body portion 14 such that it can be rotated around a front end portion of the body portion 14.

The body portion 14 includes a stacker 16. The stacker 16 is provided under the ejecting port 12B. The stacker 16 can be slid forward and rearward. The document D ejected through the ejecting port 12B can be stacked on the stacker 16. The document D ejected through the ejecting port 12B is a document after reading an image. As described here, the image reading apparatus 11 is configured such that the document after reading the image is ejected onto the stacker 16 through the ejecting port 12B.

In the drawings, the direction in which the document D is transported is illustrated as "transportation direction Y", and the direction orthogonal to the transportation direction Y is illustrated as "width direction X". The width direction X is a main-scan direction when the image reading apparatus 11 reads an image from the document D, and the transportation direction Y is a sub-scan direction. The main-scan direction will be hereinafter referred to as "main-scan direction X", with the same reference alphabet as that of the width direction X assigned thereto. The sub-scan direction will be hereinafter referred to as "sub-scan direction Y", with the same reference alphabet as that of the transportation direction Y assigned thereto.

The body 12 includes an operation unit 17. The operation unit 17 is provided on the front of the cover portion 15. The operation unit 17 includes a plurality of switches that can be operated by a user. The plurality of switches includes a power switch 17A, a start switch 17B, and a stop switch 17C.

The body 12 includes an informing unit 18. The informing unit 18 is provided at a position next to the operation unit 17. The informing unit 18 may be, for example, comprised of indicator lamps such as LEDs. Alternatively, the informing unit 18 may be a display device including a liquid crystal panel or the like. The informing unit 18 displays information needed by the user, for example, power ON/OFF information.

Internal Configuration of Image Reading Apparatus 11

Figure 3:
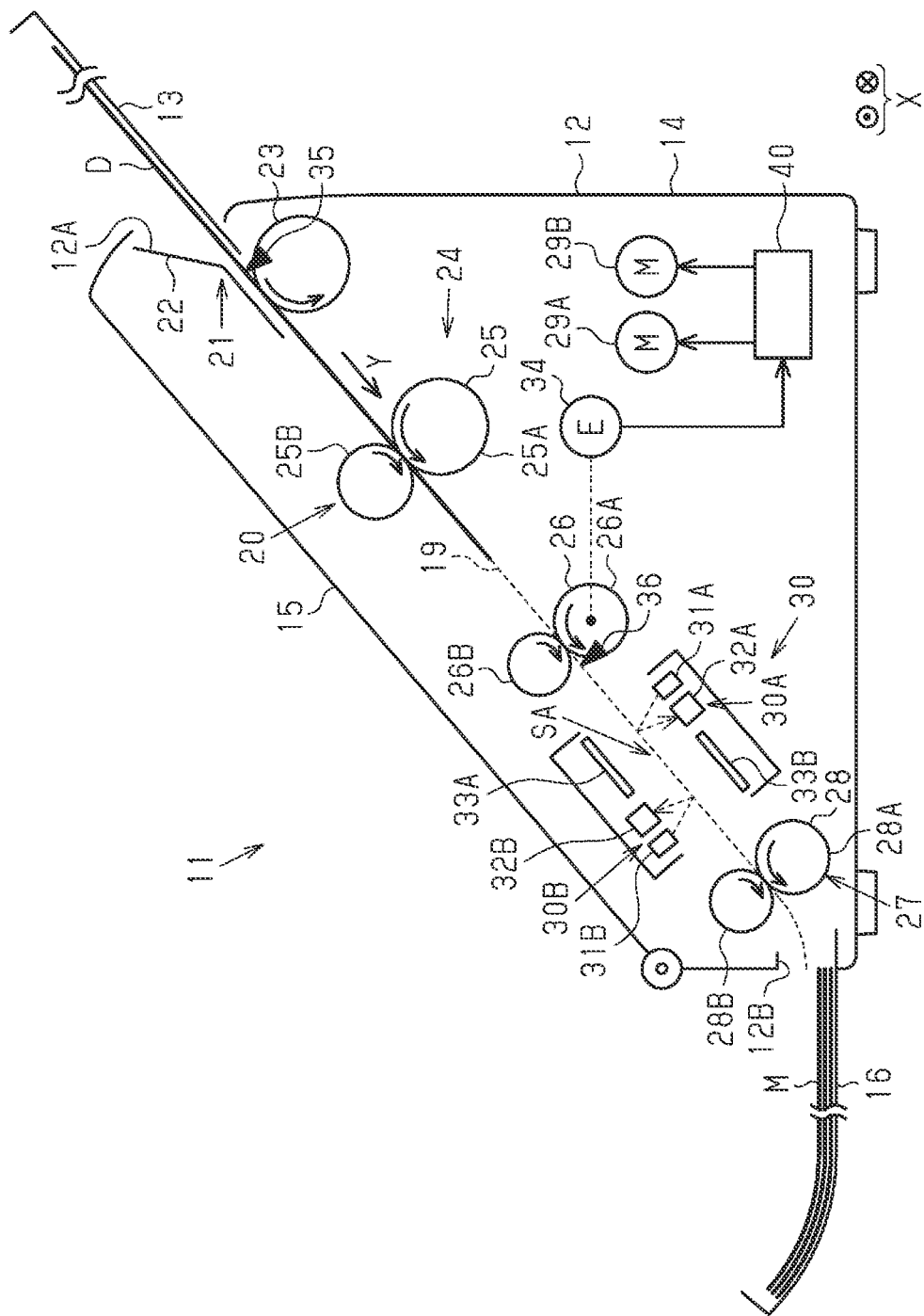
FIG. 3 is a schematic cross-sectional side view of the image reading apparatus.

As illustrated in FIG. 3, the image reading apparatus 11 has a transportation path 19. The transportation path 19 is provided inside the body 12. The transportation path 19 is a path along which the document D is transported. The transportation path 19 includes a scanning area SA. The scanning area SA is an area for reading an image from the document D.

The image reading apparatus 11 includes a transportation mechanism 20. The transportation mechanism 20 is provided inside the body 12. The transportation mechanism 20 transports the document D along the transportation path 19.

The transportation mechanism 20 transports the document D such that it passes through the scanning area SA.

The transportation mechanism 20 includes a feeder unit 21. The feeder unit 21 feeds sheets of the document D placed on the document support 13 into the body 12 one by one. The feeder unit 21 includes a feeding guide 22. The feeding guide 22 guides the document D fed into the body 12 from the document support 13. The feeder unit 21 includes a single feeding roller 23. The feeding roller 23 is provided at an upstream end of the transportation path 19 inside the body 12. The feeding roller 23 is a single pick-up roller facing the feeding guide 22. The feeder unit 21 feeds the sheets of the document D stacked on the document support 13 through the feeding port 12A along the feeding guide 22 one by one.

The transportation mechanism 20 includes a transportation unit 24. The transportation unit 24 is configured to transport, along the transportation path 19, the document D having been fed thereto by the feeder unit 21.

The transportation unit 24 includes a pair of feeding rollers 25. The pair of feeding rollers 25 is provided downstream of the feeding roller 23 in the transportation direction Y. The pair of feeding rollers 25 includes a feeding driving roller 25A and a feeding separation roller 25B. The feeding separation roller 25B has a greater coefficient of friction of its outer circumferential surface against the document D than that of the feeding driving roller 25A. The feeding separation roller 25B rotates at a speed that is slightly lower than a speed at which the feeding driving roller 25A rotates. Therefore, even when multiple feeding, namely, a phenomenon that two or more sheets of the document D are picked up and fed together from the feeding roller 23, occurs, the pair of feeding rollers 25 separates the bottom one of the multiple-fed sheets and feeds this one downstream in the transportation direction Y.

The transportation unit 24 includes a pair of transporting rollers 26. The pair of transporting rollers 26 is provided downstream of the pair of feeding rollers 25 in the transportation direction Y. The pair of transporting rollers 26 is provided upstream of the scanning area SA in the transportation direction Y. The pair of transporting rollers 26 includes a transporting driving roller 26A and a transporting driven roller 26B. The transporting rollers 26 making up the pair rotate in such a way as to transport the document D at the same transportation speed when the document D is scanned. The transporting driven roller 26B rotates passively when driven by rotation of the transporting driving roller 26A.

The transportation mechanism 20 includes an ejector unit 27. The ejector unit 27 ejects the document D after reading an image. The ejector unit 27 includes a pair of ejecting rollers 28. The pair of ejecting rollers 28 is provided downstream of the scanning area SA in the transportation direction Y. Cooperating with the pair of transporting rollers 26, the pair of ejecting rollers 28 transports the document D that is being scanned. The pair of ejecting rollers 28 includes an ejecting driving roller 28A and an ejecting driven roller 28B. The ejecting rollers 28 making up the pair rotate in such a way as to transport the document D at the same transportation speed when the document D is scanned. The ejecting driven roller 28B rotates passively when driven by rotation of the ejecting driving roller 28A.

The image reading apparatus 11 includes a feeding motor 29A and a transportation motor 29B. The feeding motor 29A is a drive power source for causing the feeding roller 23 and the feeding driving roller 25A to rotate. The transportation motor 29B is a drive power source for causing the feeding separation roller 25B, the transporting driving roller 26A, and the ejecting driving roller 28A to rotate.

The image reading apparatus 11 includes a reading unit 30. The reading unit 30 is provided inside the body 12. The reading unit 30 is configured to read an image from the document D transported along the transportation path 19. The reading unit 30 is provided between the pair of transporting rollers 26 and the pair of ejecting rollers 28 in the transportation direction Y.

The reading unit 30 may include a first reading unit 30A and a second reading unit 30B. The first reading unit 30A scans the front of the document D. The second reading unit 30B scans the back of the document D. The first reading unit 30A and the second reading unit 30B are provided at respective sides, with the transportation path 19 interposed therebetween. The first reading unit 30A and the second reading unit 30B are provided at positions shifted from each other by a short distance in the transportation direction Y. When the front only of the document D is scanned, the first reading unit 30A performs reading operation, and the second reading unit 30B does not perform reading operation. When both sides of the document D are scanned, both the first reading unit 30A and the second reading unit 30 perform reading operation.

The first reading unit 30A includes a first light source 31A. The first light source 31A is capable of applying light to the document D that is being transported. The first light source 31A is, for example, comprised of LEDs, configured as a fluorescent lamp, or the like.

The first reading unit 30A includes a first image sensor 32A. The first image sensor 32A extends in the width direction X. An example of the first image sensor 32A is a linear image sensor. The first image sensor 32A may be a contact-type image sensor in which plural photoelectric conversion elements are arranged in a row in the width direction X. Specifically, the first image sensor 32A may be a complementary metal oxide semiconductor (CMOS) image sensor. Light emitted from the first light source 31A is reflected by the document D, and the first image sensor 32A receives this reflected light. The first image sensor 32A converts the light received by each of the photoelectric conversion elements into an electric signal and outputs each pixel signal whose value corresponds to the amount of the received light. The image reading apparatus 11 may be configured to be capable of performing color scanning and monochrome scanning (grayscale scanning).

The first reading unit 30A includes a first color reference plate 33A. The first color reference plate 33A is provided at a position where it faces the first image sensor 32A, with the transportation path 19 interposed therebetween. The first color reference plate 33A is used for obtaining a white reference value for shading correction.

The second reading unit 30B has the same function as that of the first reading unit 30A. Therefore, a detailed explanation of the second reading unit 30B is omitted. The second reading unit 30B includes a second light source 31B, a second image sensor 32B, and a second color reference plate 33B. The second light source 31B has the same function as that of the first light source 31A. The second image sensor 32B has the same function as that of the first image sensor 32A. The second color reference plate 33B has the same function as that of the first color reference plate 33A.

The image reading apparatus 11 includes an encoder 34. The encoder 34 is provided inside the body 12. The encoder 34 may be, for example, a rotary encoder. The encoder 34 may be configured to be capable of detecting the rotation of the transporting driving roller 26A. The encoder 34 may be configured to be capable of detecting the rotation of any other roller. The encoder 34 outputs a detection signal that includes pulses the number of which is proportional to an amount of rotation of the driving roller.

The image reading apparatus 11 includes a first document sensor 35. The first document sensor 35 is provided slightly upstream of the feeding roller 23 in the transportation direction Y. The first document sensor 35 detects the presence/absence of the document D and outputs a detection signal. The first document sensor 35 may be a contact-type sensor that includes, for example, a lever. The first document sensor 35 may be a non-contact-type sensor such as an optical sensor. When the document D is placed on the document support 13, the document D pushes the lever. By this means, the first document sensor 35 detects that there exists the document D placed on the document support 13.

The image reading apparatus 11 includes a second document sensor 36. The second document sensor 36 is provided slightly downstream of the nip point of the pair of transporting rollers 26 in the transportation direction Y. The second document sensor 36 detects the presence/absence of the document D and outputs a detection signal. The second document sensor 36 may be a contact-type sensor that includes, for example, a lever. The second document sensor 36 may be a non-contact-type sensor such as an optical sensor. When the document D is transported by the pair of transporting rollers 26, the leading edge of the document D pushes the lever. By this means, the second document sensor 36 detects that the document D transported by the pair of transporting rollers 26 is present. After the document D is transported by the pair of transporting rollers 26 and the trailing edge of the document D passes, the lever is no longer pushed. By this means, the second document sensor 36 detects that the document D transported by the pair of transporting rollers 26 is absent.

Electric Configuration of Image Reading System 10

Next, with reference to FIG. 4, an electric configuration of the image reading system 10 will now be explained.

Figure 4:
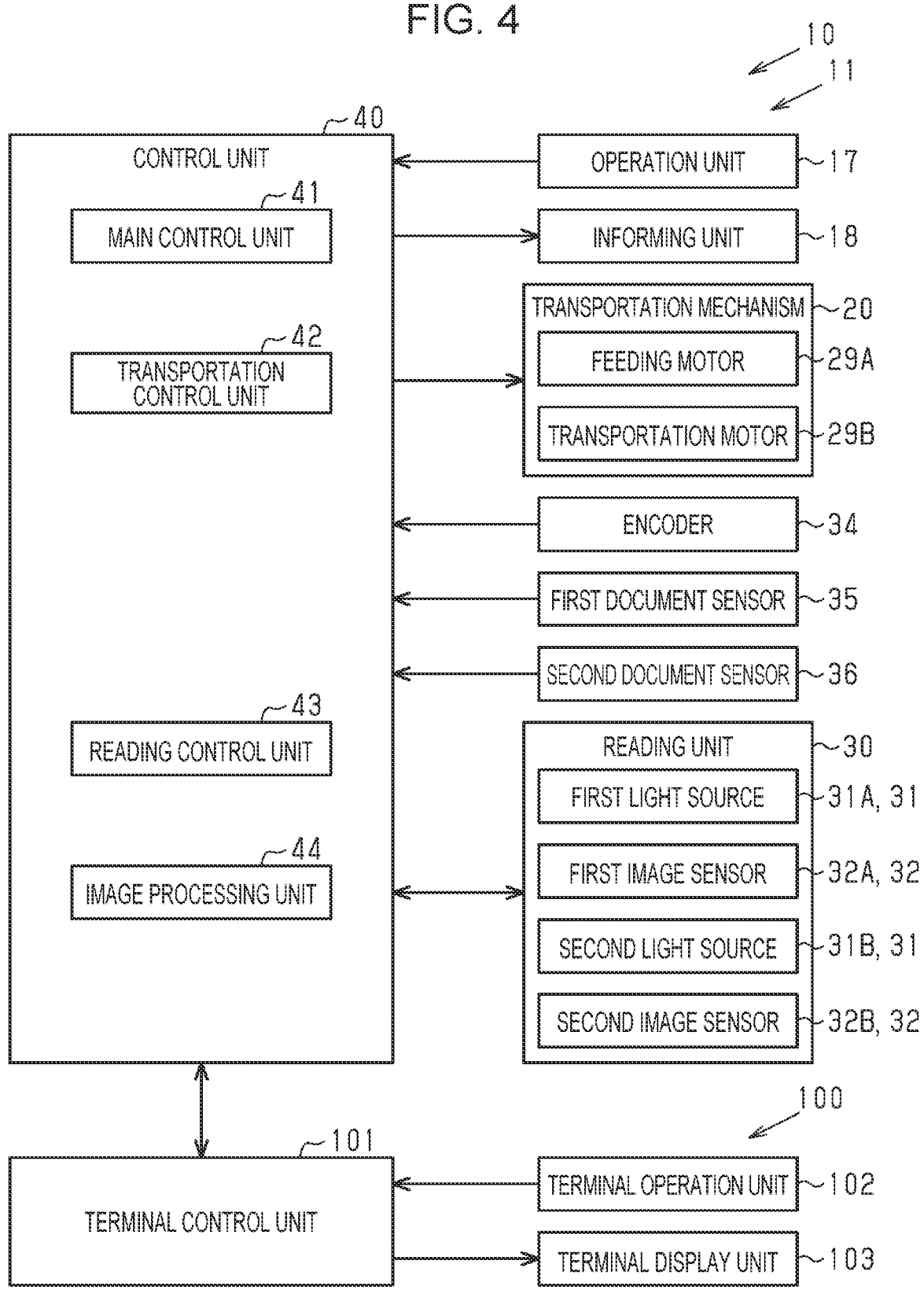
FIG. 4 is a block diagram illustrating the image reading system.

As illustrated in FIG. 4, in the image reading system 10, the image reading apparatus 11 is connected to the terminal apparatus 100 such that communication can be performed therebetween. The connection between the image reading apparatus 11 and the terminal apparatus 100 may be either wired connection or wireless connection.

The image reading apparatus 11 includes a control unit 40. The control unit 40 may control the image reading apparatus 11 centrally and control various kinds of operation performed in the image reading apparatus 11. That is, the control unit 40 performs control regarding reading an image. The control unit 40 may include one or more processors configured to perform various kinds of processing in accordance with a program, one or more exclusive-purpose hardware circuits such as an application-specific integrated circuit configured to perform at least a part of various kinds of processing, or a combination of them. The processor includes a CPU and a memory such as a RAM and a ROM. Program codes or instructions configured to cause the CPU to perform processing are stored in the memory. The memory, that is, a computer-readable medium, encompasses every kind of readable medium that is accessible by a general-purpose or an exclusive-purpose computer.

The control unit 40 is connected to the operation unit 17, the informing unit 18, the feeding motor 29A, the transportation motor 29B, the encoder 34, the first document sensor 35, the second document sensor 36, and the reading unit 30. The control unit 40 is capable of receiving signal inputs from the operation unit 17, the encoder 34, the first document sensor 35, the second document sensor 36, and the reading unit 30. The control unit 40 is capable of outputting signals to the informing unit 18, the feeding motor 29A, the transportation motor 29B, and the reading unit 30.

The control unit 40 includes a timing generator that is not illustrated. The timing generator outputs a pulse signal indicating the timing of reading operation to the reading unit 30. The control unit 40 includes an analog front end that is not illustrated. The analog front end converts the signal format of pixel signals supplied from the first image sensor 32A and the second image sensor 32B from analog to digital.

The control unit 40 includes various functional units whose functions are implemented by program execution. More specifically, the control unit 40 includes a main control unit 41, a transportation control unit 42, a reading control unit 43, and an image processing unit 44. The main control unit 41 performs central control on the image reading apparatus 11.

The transportation control unit 42 performs control for transporting the document D along the transportation path 19. In accordance with instructions from the main control unit 41, the transportation control unit 42 controls the drive operation of the feeding motor 29A and the transportation motor 29B. More particularly, the transportation control unit 42 controls the drive operation of the feeding motor 29A and the transportation motor 29B such that the document D will be transported at a transportation speed corresponding to a reading resolution. Specifically, for example, when the reading resolution is 300 dpi, which is relatively low, the transportation control unit 42 causes the document D to be transported at a speed higher than in a case where the reading resolution is 600 dpi, which is relatively high.

The reading control unit 43 controls the reading unit 30 via the timing generator. More particularly, the reading control unit 43 controls the light emission of the first light source 31A and the second light source 31B. The reading control unit 43 performs control for causing the first image sensor 32A and the second image sensor 32B to perform readout operation. By this means, the reading control unit 43 performs control for causing the reading unit 30 to read an image from the document D.

The image processing unit 44 processes image data of the image read by the reading unit 30. The image data of the image read by the reading unit 30 will be hereinafter referred to as "read image data". The image processing unit 44 stores the read image data temporarily. The image processing unit 44 conducts an analysis of the read image data. Based on the results of the analysis, the image processing unit 44 is capable of correcting the read image data. The image processing unit 44 outputs the corrected image data to the terminal apparatus 100.

The terminal apparatus 100 may be, for example, a personal computer. The terminal apparatus 100 may be a portable terminal device. The terminal apparatus 100 includes a terminal control unit 101.

The terminal control unit 101 may control the terminal apparatus 100 centrally and control various kinds of operation performed in the terminal apparatus 100. The terminal apparatus 100 is connected to the image reading apparatus 11, which performs control regarding reading an image, such that communication can be performed therebetween. That is, it can also be said that the terminal control unit 101 performs control regarding reading an image. The terminal control unit 101 may include one or more processors configured to perform various kinds of processing in accordance with a program. The processor includes a CPU and a memory such as a RAM and a ROM. Program codes or instructions configured to cause the CPU to perform processing are stored in the memory. The memory, that is, a computer-readable medium, encompasses every kind of readable medium that is accessible by a general-purpose or an exclusive-purpose computer. The terminal control unit 101 may include a reading driver. The reading driver is a driver that has a function of giving reading instructions to the image reading apparatus 11.

The terminal apparatus 100 includes a terminal operation unit 102 and a terminal display unit 103. The terminal operation unit 102 can be operated by the user. That is, the terminal operation unit 102 is capable of receiving an input of user instructions. The terminal display unit 103 is configured to perform image display. The terminal operation unit 102 corresponds to an example of an input unit. The terminal display unit 103 corresponds to an example of a display unit.

Image Processing Function

Next, with reference to FIGS. 5 to 8, the functions of the main control unit 41 and the image processing unit 44 will now be explained in detail.

Figure 5:
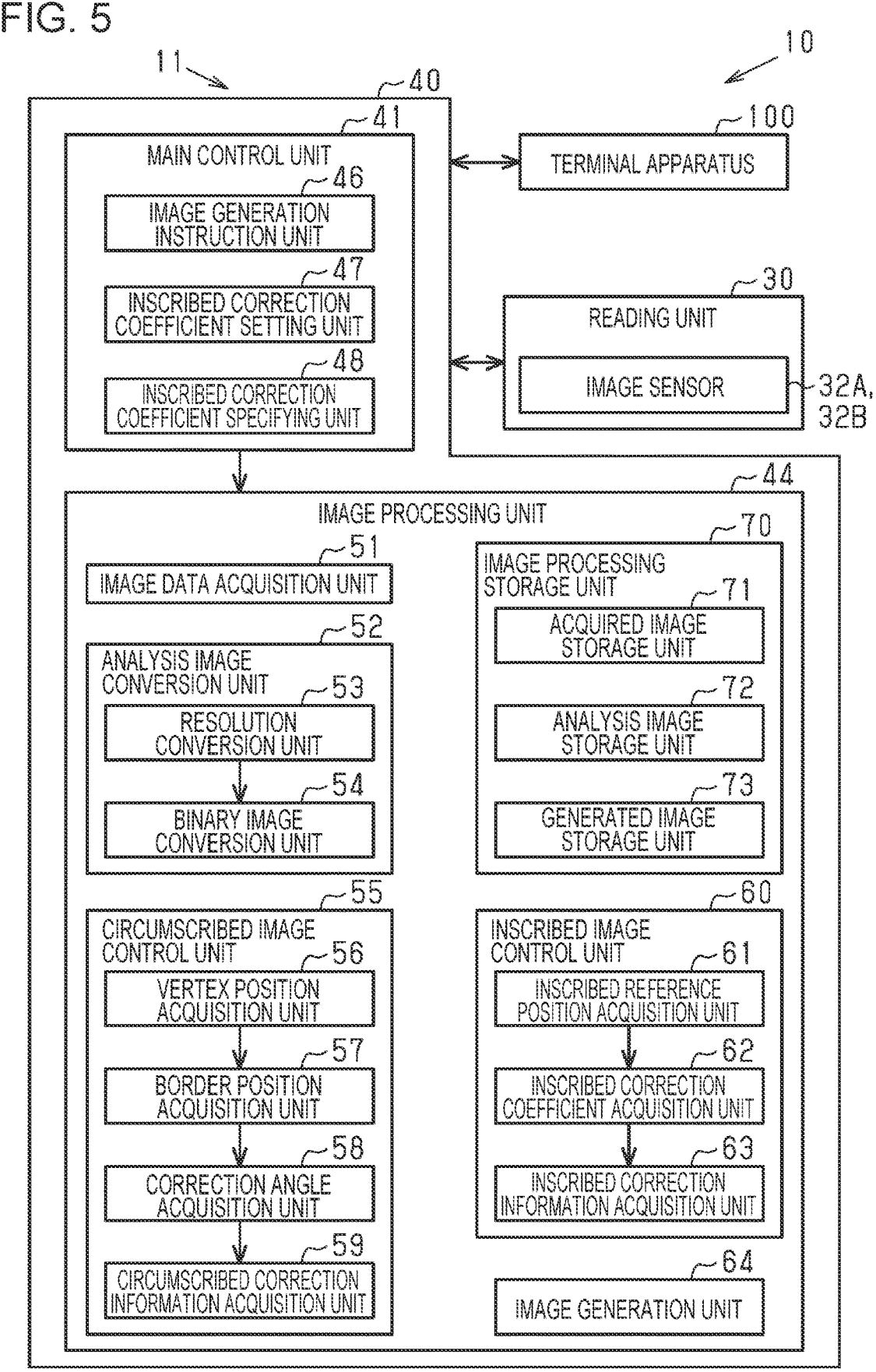
FIG. 5 is a functional block diagram illustrating functions of the image reading apparatus.

As illustrated in FIG. 5, the main control unit 41 includes an image generation instruction unit 46. The image generation instruction unit 46 instructs that corrected image data obtained by performing predetermined correction on read image data be generated. More particularly, the image generation instruction unit 46 is capable of instructing the image processing unit 44 to generate circumscribed image data as the corrected image data, based on the read image data. The image generation instruction unit 46 is capable of instructing the image processing unit 44 to generate inscribed image data as the corrected image data, based on the read image data.

Figure 6:
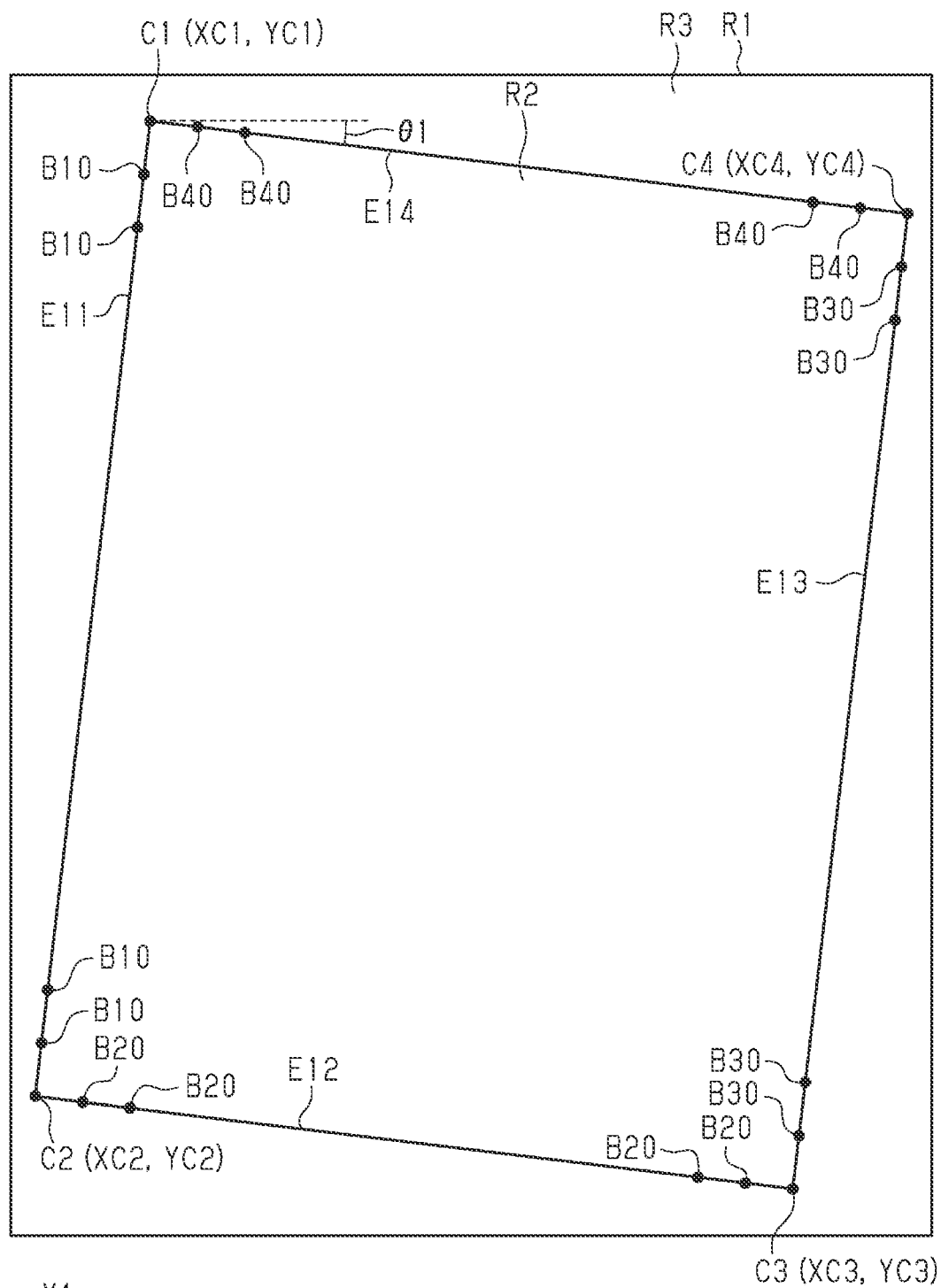
FIG. 6 is a schematic view of a reading area of image data.
Figure 6:
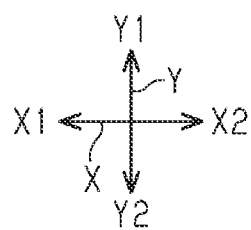

As illustrated in FIG. 6, a reading area R1 is an area of data of all pixels constituting the read image data. The reading area R1 can be divided into a document area R2 and a background area R3. The document area R2 is an area of image data corresponding to the document D. That is, the document area R2 is an area corresponding to the document D within the reading area R1. The background area R3 is an area of image data corresponding to the first color reference plate 33A or the second color reference plate 33B. In other words, the background area R3 is an area of image data not corresponding to the document D. That is, the background area R3 is an area not corresponding to the document D within the reading area R1. The reading area R1, the document area R2, and the background area R3 are areas defined for the read image data, and also for analysis image data, which will be described later.

The circumscribed image data is image data of a circumscribed image. The circumscribed image is an image that includes the whole of the document area R2. The circumscribed image is an image that includes the document area R2 with no part of it missing. The circumscribed image can also be said as an image that might include at least a part of the background area R3, depending on the read image data. The circumscribed image data corresponds to an example of first rectangular image data.

The inscribed image data is image data of an inscribed image. The inscribed image is an image that does not include the background area R3 and includes at least a part of the document area R2. The inscribed image can also be said as an image that might allow edge portions of the document area R2 to be missing, depending on the read image data, though the background area R3 is never included. The inscribed image data corresponds to an example of second rectangular image data.

As illustrated in FIG. 5, the image generation instruction unit 46 is capable of instructing the image processing unit 44 to generate a circumscribed image. More particularly, the image generation instruction unit 46 may instruct the image processing unit 44 to generate a circumscribed image when an image reading condition is met. The image reading condition can be met based on operation on the operation unit 17. The image reading condition can be met based on an input of image reading information from the terminal apparatus 100.

The image generation instruction unit 46 is capable of instructing the image processing unit 44 to generate an inscribed image. More particularly, the image generation instruction unit 46 may instruct the image processing unit 44 to generate an inscribed image based on an inscribed image request sent from the terminal apparatus 100 after the image reading condition is met.

The main control unit 41 includes an inscribed correction coefficient setting unit 47. Based on a setting signal sent from the terminal apparatus 100, the inscribed correction coefficient setting unit 47 sets an inscribed correction coefficient. The inscribed correction coefficient is a coefficient by which a correction value of the read image data is multiplied when inscribed image data is generated. That is, the inscribed correction coefficient is a parameter used for adjustment of the correction value of the read image data when inscribed image data is generated.

The inscribed correction coefficient may include a first inscribed correction coefficient, a second inscribed correction coefficient, and a third inscribed correction coefficient. The first inscribed correction coefficient may be a coefficient whose correction amount is smaller than that of the second inscribed correction coefficient. The third inscribed correction coefficient may be a coefficient whose correction amount is larger than that of the second inscribed correction coefficient. Specifically, for example, the first inscribed correction coefficient may be 0.75, the second inscribed correction coefficient may be 1.0, and the third inscribed correction coefficient may be 1.25. That is, the second inscribed correction coefficient is a standard coefficient. The first inscribed correction coefficient is a coefficient that makes the correction value less than that of the second inscribed correction coefficient. The third inscribed correction coefficient is a coefficient that makes the correction value greater than that of the second inscribed correction coefficient.

The main control unit 41 includes an inscribed correction coefficient specifying unit 48. The inscribed correction coefficient specifying unit 48 specifies an inscribed correction coefficient to the image processing unit 44 when inscribed image data is generated.

The image processing unit 44 includes an image acquisition unit 51. The image acquisition unit 51 receives pixel signals from the first image sensor 32A and the second image sensor 32B via an analog front end. Based on the received pixel signals, the image acquisition unit 51 acquires the read image data. The image acquisition unit 51 stores the acquired read image data into an acquired image storage unit 71.

The image processing unit 44 includes an analysis image conversion unit 52. The analysis image conversion unit 52 converts the read image data acquired by the image acquisition unit 51 into analysis image data. The analysis image conversion unit 52 includes the resolution conversion unit 53 and the binary image conversion unit 54.

The resolution conversion unit 53 reads out the read image data stored in the acquired image storage unit 71 and converts the resolution of the read image data acquired by the image acquisition unit 51. More particularly, the resolution conversion unit 53 converts the resolution of the read image data into low resolution. Specifically, for example, when the reading resolution of the read image data is 300 dpi or 600 dpi, the resolution conversion unit 53 converts the read image data into analysis image data having a reading resolution of 75 dpi. That is, the control unit 40, which includes the resolution conversion unit 53, is capable of executing resolution conversion processing of converting the resolution of the read image data into a second reading resolution, which is lower than a first reading resolution, when the read image data has the first reading resolution. The resolution conversion unit 53 stores the image data after the conversion of the reading resolution into an analysis image storage unit 72.

The binary image conversion unit 54 reads the image data whose reading resolution has been converted by the resolution conversion unit 53 out of the analysis image storage unit 72. Then, the binary image conversion unit 54 converts the image data whose reading resolution has been converted by the resolution conversion unit 53 into binary image data. More particularly, the binary image conversion unit 54 converts RGB pixel data into black-and-white pixel data. That is, the control unit 40, which includes the binary image conversion unit 54, is capable of executing binary image conversion processing of converting the image data whose reading resolution has been converted into the second reading resolution into binary image data. The binary image conversion unit 54 stores the binary image data into the analysis image storage unit 72. As described here, the image data after the conversion of its resolution and the conversion into a binary image is stored as the analysis image data into the analysis image storage unit 72.

The image processing unit 44 includes a circumscribed image control unit 55. In accordance with instructions from the image generation instruction unit 46, the circumscribed image control unit 55 analyzes the analysis image data. Based on the result of analysis of the analysis image data, the circumscribed image control unit 55 acquires circumscribed image control data regarding generation of circumscribed image data. The circumscribed image control data includes circumscribed correction information. The circumscribed correction information includes a correction angle of the read image data, circumscribed correction origin, and circumscribed correction size. Data for acquiring the circumscribed correction information includes vertex positions and border positions of the document area R2. That is, it can also be said that the circumscribed image control data includes the vertex positions and border positions of the document area R2. The circumscribed image control data corresponds to an example of first control data. The circumscribed image control unit 55 includes a vertex position acquisition unit 56, a border position acquisition unit 57, a correction angle acquisition unit 58, and a circumscribed correction information acquisition unit 59.

As illustrated in FIGS. 5 and 6, the vertex position acquisition unit 56 reads the analysis image data out of the analysis image storage unit 72. The vertex position acquisition unit 56 acquires four vertex positions C1 to C4 of the document area R2 within the reading area R1 by analyzing the analysis image data. The four vertex positions C1 to C4 are coordinates of the corners of the document area R2, and may be regarded also as coordinates of positions that are on the edges of the document area R2. That is, the four vertex positions C1 to C4 are included in the border positions of the document area R2. As described here, the control unit 40, which includes the vertex position acquisition unit 56, acquires corner positions, which are positions of the corners of the document area R2, within the reading area R1 of the read image data.

Specifically, for example, based on the analysis image data, the vertex position acquisition unit 56 acquires the most-Y1-side coordinate position in the sub-scan direction Y as a first vertex position C1 among the coordinates of pixel data of the document area R2. The first vertex position C1 has a coordinate XC1 in the main-scan direction X and a coordinate YC1 in the sub-scan direction Y.

Based on the analysis image data, the vertex position acquisition unit 56 acquires the most-X1-side coordinate position in the main-scan direction X as a second vertex position C2 among the coordinates of pixel data of the document area R2. The second vertex position C2 has a coordinate XC2 in the main-scan direction X and a coordinate YC2 in the sub-scan direction Y.

Based on the analysis image data, the vertex position acquisition unit 56 acquires the most-Y2-side coordinate position in the sub-scan direction Y as a third vertex position C3 among the coordinates of pixel data of the document area R2. The third vertex position C3 has a coordinate XC3 in the main-scan direction X and a coordinate YC3 in the sub-scan direction Y.

Based on the analysis image data, the vertex position acquisition unit 56 acquires the most-X2-side coordinate position in the main-scan direction X as a fourth vertex position C4 among the coordinates of pixel data of the document area R2. The fourth vertex position C4 has a coordinate XC4 in the main-scan direction X and a coordinate YC4 in the sub-scan direction Y.

Based on the vertex positions C1 to C4 that have been acquired by the vertex position acquisition unit 56, the border position acquisition unit 57 acquires border positions of the document area R2 on each of its sides E11 to E14 connecting the vertex positions C1 to C4 of the document area R2. The border positions of the document area R2 are coordinates that are on the edges of the document area R2. That is, the control unit 40, which includes the border position acquisition unit 57, acquires on-edge positions, which are positions on the edges of the document area R2, within the reading area R1 of the read image data.

Specifically, for example, the border position acquisition unit 57 acquires border search coordinates by performing division into equal n parts between the coordinate YC1 of the first vertex position C1 in the sub-scan direction Y and the coordinate YC2 of the second vertex position C2 in the sub-scan direction Y. In the present embodiment, n is 128, but not limited thereto. In the division into equal n parts, n may be any arbitrary number. Based on the analysis image data, for each of the border search coordinates, the border position acquisition unit 57 acquires the most-X1-side coordinate position in the main-scan direction X as a border position B10 among the coordinates of pixel data of the document area R2. In FIG. 6, four border positions B10 are illustrated as representative examples of these border positions. The border position acquisition unit 57 acquires the first vertex position C1 and the second vertex position C2 also as border positions. In this way, the border position acquisition unit 57 acquires the plurality of border positions B10 on the first side E11 connecting the first vertex position C1 and the second vertex position C2.

The border position acquisition unit 57 acquires border search coordinates by performing division into equal n parts between the coordinate XC2 of the second vertex position C2 in the main-scan direction X and the coordinate XC3 of the third vertex position C3 in the main-scan direction X. Based on the analysis image data, for each of the border search coordinates, the border position acquisition unit 57 acquires the most-Y2-side coordinate position in the sub-scan direction Y as a border position B20 among the coordinates of pixel data of the document area R2. In FIG. 6, four border positions B20 are illustrated as representative examples of these border positions. The border position acquisition unit 57 acquires the second vertex position C2 and the third vertex position C3 also as border positions. In this way, the border position acquisition unit 57 acquires the plurality of border positions B20 on the second side E12 connecting the second vertex position C2 and the third vertex position C3.

The border position acquisition unit 57 acquires border search coordinates by performing division into equal n parts between the coordinate YC4 of the fourth vertex position C4 in the sub-scan direction Y and the coordinate YC3 of the third vertex position C3 in the sub-scan direction Y. Based on the analysis image data, for each of the border search coordinates, the border position acquisition unit 57 acquires the most-X2-side coordinate position in the main-scan direction X as a border position B30 among the coordinates of pixel data of the document area R2. In FIG. 6, four border positions B30 are illustrated as representative examples of these border positions. The border position acquisition unit 57 acquires the third vertex position C3 and the fourth vertex position C4 also as border positions. In this way, the border position acquisition unit 57 acquires the plurality of border positions B30 on the third side E13 connecting the third vertex position C3 and the fourth vertex position C4.

The border position acquisition unit 57 acquires border search coordinates by performing division into equal n parts between the coordinate XC1 of the first vertex position C1 in the main-scan direction X and the coordinate XC4 of the fourth vertex position C4 in the main-scan direction X. Based on the analysis image data, for each of the border search coordinates, the border position acquisition unit 57 acquires the most-Y1-side coordinate position in the sub-scan direction Y as a border position B40 among the coordinates of pixel data of the document area R2. In FIG. 6, four border positions B40 are illustrated as representative examples of these border positions. The border position acquisition unit 57 acquires the first vertex position C1 and the fourth vertex position C4 also as border positions. In this way, the border position acquisition unit 57 acquires the plurality of border positions B40 on the fourth side E14 connecting the first vertex position C1 and the fourth vertex position C4.

Based on the border positions, the correction angle acquisition unit 58 acquires a correction angle $\theta1$ of the read image data. The correction angle $\theta1$ of the read image data is an angle of inclination of the read image data, and is used when circumscribed image data is generated. The correction angle $\theta1$ of the read image data may be used also when inscribed image data is generated. That is, the correction angle $\theta1$ is included in circumscribed correction information and also in inscribed correction information. As described here, based on the border positions, the control unit 40, which includes the correction angle acquisition unit 58, acquires the angle of inclination of the read image data.

Specifically, for example, for all of combinations of the coordinates of the vertex positions C1 and C2 and the border positions B10 corresponding to the first side E11, the correction angle acquisition unit 58 acquires a first angle of inclination with respect to the sub-scan direction Y. For all of combinations of the coordinates of the vertex positions C2 and C3 and the border positions B20 corresponding to the second side E12, the correction angle acquisition unit 58 acquires a second angle of inclination with respect to the main-scan direction X. For all of combinations of the coordinates of the vertex positions C3 and C4 and the border positions B30 corresponding to the third side E13, the correction angle acquisition unit 58 acquires a third angle of inclination with respect to the sub-scan direction Y. For all of combinations of the coordinates of the vertex positions C1 and C4 and the border positions B40 corresponding to the fourth side E14, the correction angle acquisition unit 58 acquires a fourth angle of inclination with respect to the main-scan direction X. Then, the correction angle acquisition unit 58 acquires an average of these angles of inclination as the correction angle $\theta 1$ of the read image data.

Based on the border positions and the correction angle $\theta 1$ of the read image data, the circumscribed correction information acquisition unit 59 acquires circumscribed correction information regarding generation of circumscribed image data. More particularly, the circumscribed correction information acquisition unit 59 acquires circumscribed correction origin and circumscribed correction size as the circumscribed correction information.

Specifically, for example, based on the analysis image data, the circumscribed correction information acquisition unit 59 rotates the analysis image data by the correction angle $\theta 1$. When the circumscribed correction information acquisition unit 59 rotates the analysis image data, the border positions of the document area R2 also move due to the rotation of the analysis image data.

The circumscribed correction information acquisition unit 59 acquires the most-X1-side coordinate position in the main-scan direction X and the most-X2-side coordinate position in the main-scan direction X among the border positions of the document area R2. The circumscribed correction information acquisition unit 59 acquires the most-Y1-side coordinate position in the sub-scan direction Y and the most-Y2-side coordinate position in the sub-scan direction Y among the border positions of the document area R2. The circumscribed correction information acquisition unit 59 acquires circumscribed correction origin and circumscribed correction size by means of which it is possible to determine a rectangular area that includes the four acquired points.

As described here, the control unit 40 operating as the circumscribed image control unit 55 is capable of executing circumscribed image control processing of acquiring circumscribed image control data regarding circumscribed image data, based on the read image data. More particularly, in the circumscribed image control processing, the control unit 40 acquires the correction angle $\theta 1$, which is an angle of inclination of the read image data, as the circumscribed image control data. It can also be said that, in the circumscribed image control processing, based on binary image data, the control unit 40 acquires the circumscribed image control data. The circumscribed image control processing corresponds to an example of first rectangular image control processing.

The image processing unit 44 includes an inscribed image control unit 60. In accordance with instructions from the image generation instruction unit 46, the inscribed image control unit 60 analyzes the analysis image data. Based on the result of analysis of the analysis image data, the inscribed image control unit 60 acquires inscribed image control data regarding generation of inscribed image data. The inscribed image control data includes inscribed correction information. The inscribed correction information includes a correction angle of the read image data, inscribed correction origin, and inscribed correction size. Data for acquiring the inscribed correction information includes reference positions and an inscribed correction coefficient. That is, it can also be said that the inscribed image control data includes reference positions and an inscribed correction coefficient. The inscribed image control data corresponds to an example of second control data. The inscribed image control unit 60 includes an inscribed reference position acquisition unit 61, an inscribed correction coefficient acquisition unit 62, and an inscribed correction information acquisition unit 63.

As a specific example, a case where circumscribed image data including the background area R3 is generated when the read image data is corrected by a correction angle $\theta 2$ and a case where inscribed image data not including the background area R3 is generated when the read image data is corrected by the correction angle $\theta 2$ will now be described. In order to facilitate the understanding of the disclosed technique, the correction angle $\theta 2$ is assumed to be extremely smaller than the correction angle $\theta 1$.

Figure 7:
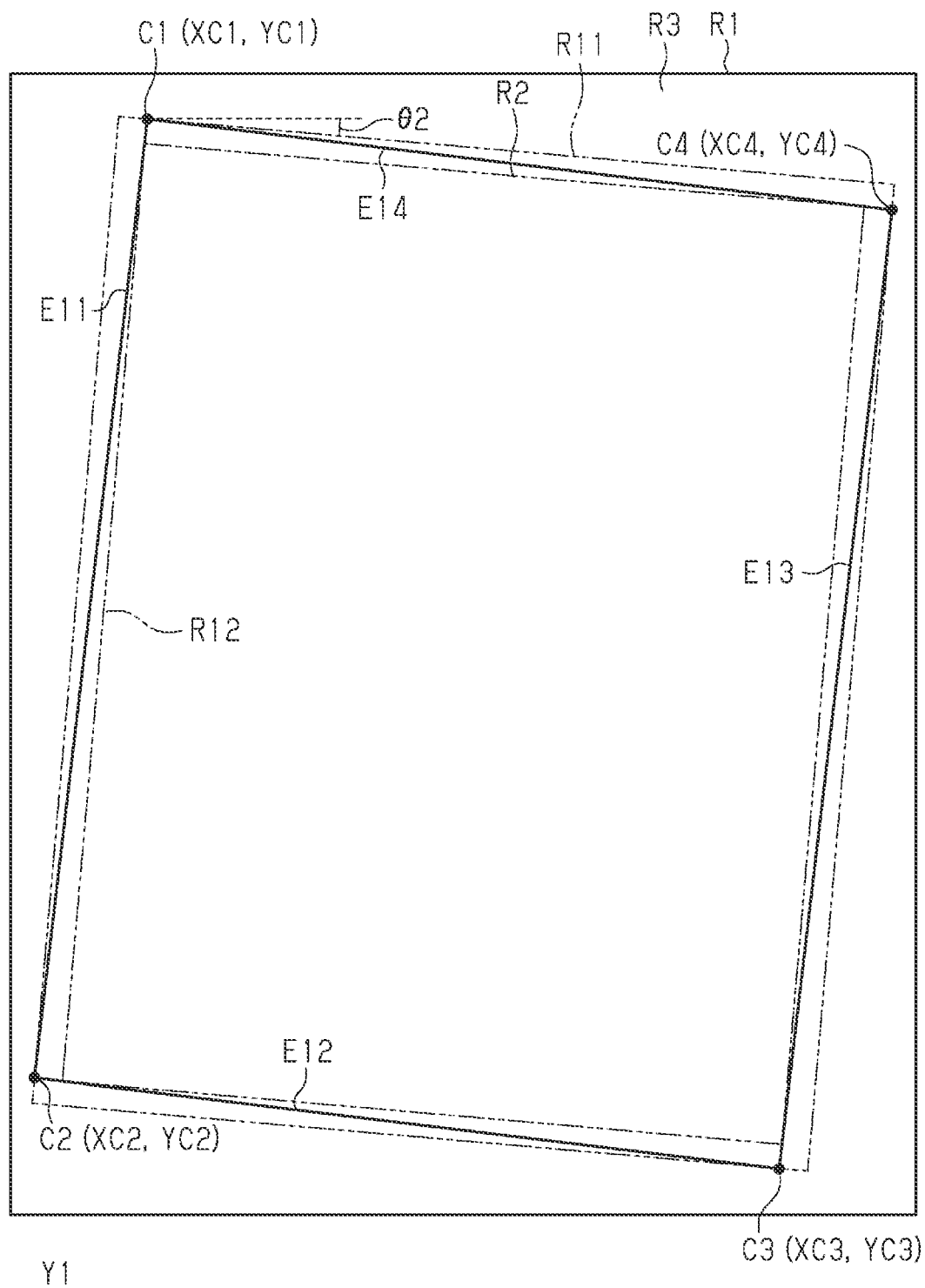
FIG. 7 is a schematic view of a reading area of image data.
Figure 8:
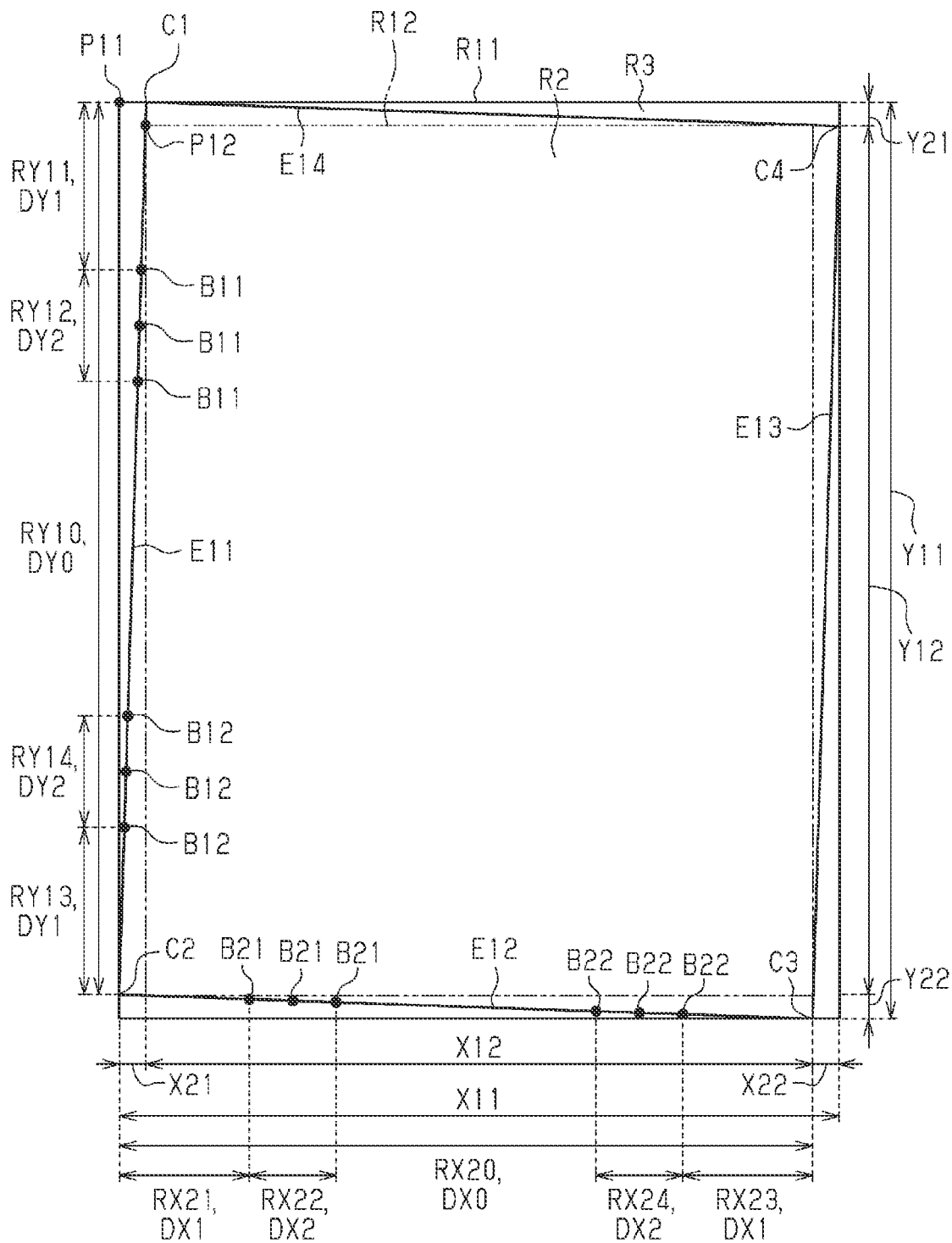
FIG. 8 is a schematic view of a reading area of image data.

As illustrated in FIGS. 7 and 8, the reading area R1 includes a circumscribed image area R11 corrected as the area of the circumscribed image. The circumscribed image area R11 includes not only the whole of the document area R2 but also a part of the background area R3. More particularly, the background area R3 is not trimmed away at each edge portion of the circumscribed image area R11.

The reading area R1 includes an inscribed image area R12 corrected as the area of the inscribed image. The inscribed image area R12 includes a part of the document area R2 but does not include any part of the background area R3. More particularly, edge portions of the document area R2 are missing in the inscribed image area R12. The inscribed image area R12 is smaller than the circumscribed image area R11.

As illustrated in FIG. 8, the circumscribed correction origin P11 of the circumscribed image and the circumscribed correction size of the circumscribed image are calculated for the circumscribed image area R11 when rotated by the correction angle $\theta 2$. The circumscribed correction size includes the correction width X11 of the circumscribed image and the correction height Y11 of the circumscribed image.

The inscribed correction origin P12 of the inscribed image and the inscribed correction size of the inscribed image are calculated for the inscribed image area R12 when rotated by the correction angle $\theta 2$, similarly to the calculation for the circumscribed image area R11. The inscribed correction size includes the correction width X12 of the inscribed image and the correction height Y12 of the inscribed image.

Compared with the circumscribed image area R11, the inscribed image area R12 has a difference corresponding to a first width X21 for the first side E11. Compared with the circumscribed image area R11, the inscribed image area R12 has a difference corresponding to a second height Y22 for the second side E12. Compared with the circumscribed image area R11, the inscribed image area R12 has a difference corresponding to a second width X22 for the third side E13. Compared with the circumscribed image area R11, the inscribed image area R12 has a difference corresponding to a first height Y21 for the fourth side E14.

As described above, the inscribed image area R12 can be calculated based on the differences from the circumscribed image area R11. The inscribed image control data is calculated based on the differences between the inscribed image area R12 and the circumscribed image area R11 and further based on the circumscribed image control data. A detailed explanation will be given later.

As illustrated in FIGS. 5 and 8, the inscribed reference position acquisition unit 61 acquires reference positions for acquiring the inscribed image control data. More particularly, the inscribed reference position acquisition unit 61 rotates the analysis image data around the circumscribed correction origin by the correction angle θ2. The inscribed reference position acquisition unit 61 performs reference position acquisition on each of the sides E11 to E14 of the document area R2 in the analysis image data having been rotated by the correction angle θ2. That is, based on the correction angle θ2 of the read image data included in the circumscribed image control data, the inscribed reference position acquisition unit 61 acquires a plurality of reference positions.

Specifically, for example, the inscribed reference position acquisition unit 61 acquires, among the border positions of the document area R2, a plurality of first reference positions B11 and a plurality of second reference positions B12 on the first side E11 of the document area R2. In FIG. 8, three first reference positions are illustrated as representative examples of the plurality of first reference positions B11, and three second reference positions are illustrated as representative examples of the plurality of second reference positions B12.

The plural first reference positions B11 are positions that are included in a reference range RY12 within a range RY10 extending from the first vertex position C1 to the second vertex position C2 in the sub-scan direction Y; a range RY11, which is within a distance DY1 from the first vertex position C1, is not included therein. The reference range RY12 is a range from a position located at the distance DY1 from the first vertex position C1 to a position located at a distance DY2 from the position located at the distance DY1 within the range RY10 in the sub-scan direction Y.

In the sub-scan direction Y, the distance DY1 may be $3/16$ of a distance DY0 from the first vertex position C1 to the second vertex position C2. In the sub-scan direction Y, the distance DY2 may be $1/8$ of the distance DY0.

That is, the reference range RY12 is a range from a position located at a distance that is $3/16$ of the distance DY0 from the first vertex position C1 to a position located at a distance that is $5/16$ of the distance DY0 from the first vertex position C1 in the sub-scan direction Y. It can also be said that, when a position located at a distance that is $1/4$ of the distance DY0 from the first vertex position C1 in the sub-scan direction Y is taken as a reference point, the reference range RY12 is a range from a position located at a distance that is $1/16$ of the distance DY0 in the first sub-scan direction Y1 from the reference point to a position located at a distance that is $1/16$ of the distance DY0 in the second sub-scan direction Y2 from the reference point.

Similarly to the plural first reference positions B11, the plural second reference positions B12 are positions that are included in a pre-determined reference range RY14 within the range RY10 in the sub-scan direction Y; a range RY13, which is within the distance DY1 from the second vertex position C2, is not included therein. The reference range RY14 is a range from a position located at the distance DY1 from the second vertex position C2 to a position located at the distance DY2 from the position located at the distance DY1 within the range RY10 in the sub-scan direction Y.

That is, the reference range RY14 is a range from a position located at a distance that is $3/16$ of the distance DY0 from the second vertex position C2 to a position located at a distance that is $5/16$ of the distance DY0 from the second vertex position C2 in the sub-scan direction Y. It can also be said that, when a position located at a distance that is $1/4$ of the distance DY0 from the second vertex position C2 in the sub-scan direction Y is taken as a reference point, the reference range RY14 is a range from a position located at a distance that is $1/16$ of the distance DY0 in the first sub-scan direction Y1 from the reference point to a position located at a distance that is $1/16$ of the distance DY0 in the second sub-scan direction Y2 from the reference point.

The inscribed reference position acquisition unit 61 acquires an average of the coordinates of the first reference positions B11 with respect to the sub-scan direction Y for the first side E11 of the document area R2. The inscribed reference position acquisition unit 61 acquires an average of the coordinates of the second reference positions B12 with respect to the sub-scan direction Y for the first side E11 of the document area R2. Then, the inscribed reference position acquisition unit 61 acquires a difference between the average of the coordinates of the first reference positions B11 with respect to the sub-scan direction Y and the average of the coordinates of the second reference positions B12 with respect to the sub-scan direction Y.

As described above, the first side E11 that is based on the vertex positions C1 and C2 of the document area R2 includes the range RY11, which is within the distance DY1 from the vertex position C1 of the document area R2, and the range RY13, which is within the distance DY1 from the vertex position C2 of the document area R2. The first side E11 that is based on the vertex positions C1 and C2 of the document area R2 includes the reference range RY12, which is a range from a position located at the distance DY1 from the vertex position C1 of the document area R2 to a position located at the distance DY2 from this position located at the distance DY1, and the reference range RY14, which is a range from a position located at the distance DY1 from the vertex position C2 of the document area R2 to a position located at the distance DY2 from this position located at the distance DY1. On the first side E11 that is based on the vertex positions C1 and C2 of the document area R2, the plurality of reference positions B11 is included in the reference range RY12, and the plurality of reference positions B12 is included in the reference range RY14. The range RY11, RY13 corresponds to an example of a first range. The reference range RY12, RY14 corresponds to an example of a second range. The distance DY1 corresponds to an example of a first distance. The distance DY2 corresponds to an example of a second distance.

Next, the inscribed reference position acquisition unit 61 acquires, among the border positions of the document area R2, a plurality of third reference positions B21 and a plurality of fourth reference positions B22 on the second side E12 of the document area R2. In FIG. 8, three third reference positions are illustrated as representative examples of the plurality of third reference positions B21, and three fourth reference positions are illustrated as representative examples of the plurality of fourth reference positions B22.

The plural third reference positions B21 are positions that are included in a pre-determined reference range RX22 within a range RX20 extending from the second vertex position C2 to the third vertex position C3 in the main-scan direction X; a range RX21, which is within a distance DX1 from the second vertex position C2, is not included therein. The reference range RX22 is a range from a position located at the distance DX1 from the second vertex position C2 to a position located at a distance DX2 from the position located at the distance DX1 within the range RX20 in the main-scan direction X.

In the main-scan direction X, the distance DX1 may be ³⁄₁₆ of a distance DX0 from the second vertex position C2 to the third vertex position C3. In the main-scan direction X, the distance DX2 may be ⅛ of the distance DX0.

That is, the reference range RX22 is a range from a position located at a distance that is ³⁄₁₆ of the distance DX0 from the second vertex position C2 to a position located at a distance that is ⁵⁄₁₆ of the distance DX0 from the second vertex position C2 in the main-scan direction X. It can also be said that, when a position located at a distance that is ¼ of the distance DX0 from the second vertex position C2 in the main-scan direction X is taken as a reference point, the reference range RX22 is a range from a position located at a distance that is ¹⁄₁₆ of the distance DX0 in the first main-scan direction X1 from the reference point to a position located at a distance that is ¹⁄₁₆ of the distance DX0 in the second main-scan direction X2 from the reference point.

Similarly to the plural third reference positions B21, the plural fourth reference positions B22 are positions that are included in a pre-determined reference range RX24 within the range RX20 in the main-scan direction X; a range RX23, which is within the distance DX1 from the third vertex position C3, is not included therein. The reference range RX24 is a range from a position located at the distance DX1 from the third vertex position C3 to a position located at the distance DX2 from the position located at the distance DX1 within the range RX20 in the main-scan direction X.

That is, the reference range RX24 is a range from a position located at a distance that is ³⁄₁₆ of the distance DX0 from the third vertex position C3 to a position located at a distance that is ⁵⁄₁₆ of the distance DX0 from the third vertex position C3 in the main-scan direction X. It can also be said that, when a position located at a distance that is ¼ of the distance DX0 from the third vertex position C3 in the main-scan direction X is taken as a reference point, the reference range RX24 is a range from a position located at a distance that is ¹⁄₁₆ of the distance DX0 in the first main-scan direction X1 from the reference point to a position located at a distance that is ¹⁄₁₆ of the distance DX0 in the second main-scan direction X2 from the reference point.

As described above, the second side E12 that is based on the vertex positions C2 and C3 of the document area R2 includes the range RX21, which is within the distance DX1 from the vertex position C2 of the document area R2, and the range RX23, which is within the distance DX1 from the vertex position C3 of the document area R2. The second side E12 that is based on the vertex positions C2 and C3 of the document area R2 includes the reference range RX22, which is a range from a position located at the distance DX1 from the vertex position C2 of the document area R2 to a position located at the distance DX2 from this position located at the distance DX1, and the reference range RX24, which is a range from a position located at the distance DX1 from the vertex position C3 of the document area R2 to a position located at the distance DX2 from this position located at the distance DX1. On the second side E12 that is based on the vertex positions C2 and C3 of the document area R2, the plurality of reference positions B21 is included in the reference range RX22, and the plurality of reference positions B22 is included in the reference range RX24. The range RX21, RX23 corresponds to an example of a first range. The reference range RX22, RX24 corresponds to an example of a second range. The distance DX1 corresponds to an example of a first distance. The distance DX2 corresponds to an example of a second distance.

The inscribed reference position acquisition unit 61 acquires an average of the coordinates of the third reference positions B21 with respect to the main-scan direction X for the second side E12 of the document area R2. The inscribed reference position acquisition unit 61 acquires an average of the coordinates of the fourth reference positions B22 with respect to the main-scan direction X for the second side E12 of the document area R2. Then, the inscribed reference position acquisition unit 61 acquires a difference between the average of the coordinates of the third reference positions B21 with respect to the main-scan direction X and the average of the coordinates of the fourth reference positions B22 with respect to the main-scan direction X.

The inscribed reference position acquisition unit 61 acquires, among the border positions of the document area R2, reference positions on the third side E13 of the document area R, as done for the first side E11 of the document area R2. The inscribed reference position acquisition unit 61 acquires a difference between the averages of the coordinates of the reference positions with respect to the sub-scan direction Y for the third side E13 of the document area R2, as done for the first side E11 of the document area R2.

The inscribed reference position acquisition unit 61 acquires, among the border positions of the document area R2, reference positions on the fourth side E14 of the document area R, as done for the second side E12 of the document area R2. The inscribed reference position acquisition unit 61 acquires a difference between the averages of the coordinates of the reference positions with respect to the main-scan direction X for the fourth side E14 of the document area R2, as done for the second side E12 of the document area R2.

In accordance with instructions from the inscribed correction coefficient specifying unit 48, the inscribed correction coefficient acquisition unit 62 acquires an inscribed correction coefficient. More particularly, in accordance with instructions from the inscribed correction coefficient specifying unit 48, the inscribed correction coefficient acquisition unit 62 acquires the specified one among the first inscribed correction coefficient, the second inscribed correction coefficient, and the third inscribed correction coefficient as the inscribed correction coefficient.

Based on the correction angle θ2 of the read image data, the difference between the averages of the coordinates of the reference positions, and the inscribed correction coefficient, the inscribed correction information acquisition unit 63 acquires inscribed image control data regarding generation of inscribed image data. More particularly, the inscribed correction information acquisition unit 63 acquires inscribed correction origin and inscribed correction size as inscribed correction information. That is, based on the correction angle θ2 of the read image data included in the circumscribed image control data, the inscribed correction information acquisition unit 63 acquires the inscribed correction origin and the inscribed correction size as the inscribed correction information.

Specifically, for example, for each of the sides E11 to E14 of the document area R2, the inscribed correction information acquisition unit 63 multiplies the difference between the averages of the coordinates of the reference positions by "2" and the inscribed correction coefficient. By performing this multiplication processing, the inscribed correction information acquisition unit 63 calculates the differences between the circumscribed image and the inscribed image for each of the sides E11 to E14 of the document area R2. The differences between the circumscribed image and the inscribed image include the difference corresponding to the first width X21 for the first side E11, the difference corresponding to the second height Y22 for the second side E12, the difference corresponding to the second width X22 for the third side E13, the difference corresponding to the first height Y21 for the fourth side E14.

An explanation will be given below while taking the first side E11 as a representative example. The plural first reference positions B11 are located such that their reference point lies at, from the first vertex position C1, a distance that is ¼ of the distance DY0 from the first vertex position C1 to the second vertex position C2 in the sub-scan direction Y. The plural second reference positions B12 are located such that their reference point lies at, from the first vertex position C1, a distance that is ¾ of the distance DY0 from the first vertex position C1 to the second vertex position C2 in the sub-scan direction Y. That is, the reference point lying at the center of the plurality of first reference positions B11 and the reference point lying at the center of the plurality of second reference positions B12 are at a distance from each other by ½ of the distance DY0 from the first vertex position C1 to the second vertex position C2. For this reason, by multiplying the difference between the averages of the coordinates of the reference positions by "2", the inscribed correction information acquisition unit 63 is capable of acquiring the difference corresponding to the first width X21 as the difference between the circumscribed image and the inscribed image for the first side E11 connecting the first vertex position C1 and the second vertex position C2. By taking the positions that are at a distance from each other by ½ of the distance DY0 as the reference point of the plurality of first reference positions B11 and the reference point of the plurality of second reference positions B12 in this way, it is possible to reduce the burden of control regarding the calculation of the difference between the circumscribed image and the inscribed image. Moreover, taking a position located at a distance that is ¼ of the distance DY0 from the corresponding vertex position as each reference point for the plurality of first reference positions B11 and the plurality of second reference positions B12 makes it less susceptible to the effects of a cut or a tear caused by stapling or the like at the vertex position C1, C2.

Based on the difference between the circumscribed image and the inscribed image, for each of the sides E11 to E14 of the document area R2, the inscribed correction information acquisition unit 63 acquires the inscribed correction size of the inscribed image area R12. More specifically, for each of the sides E11 to E14 of the document area R2, the inscribed correction information acquisition unit 63 subtracts the difference between the circumscribed image and the inscribed image from the circumscribed correction size to acquire the inscribed correction size.

Based on the differences between the circumscribed image and the inscribed image, for the first side E11 and the fourth side E14 of the document area R2, the inscribed correction information acquisition unit 63 acquires the inscribed correction origin of the inscribed image area R12. More specifically, for the first side E11 and the fourth side E14 of the document area R2, the inscribed correction information acquisition unit 63 performs addition of the differences between the circumscribed image and the inscribed image with respect to the circumscribed correction origin to acquire the inscribed correction origin.

As described here, the control unit 40 operating as the inscribed image control unit 60 is capable of executing inscribed image control processing of acquiring inscribed image control data, based on the circumscribed image control data. More particularly, in the inscribed image control processing, based on the plurality of reference positions and the correction angle θ2 of the read image data, the control unit 40 acquires the inscribed correction origin and the inscribed correction size as the inscribed image control data. The inscribed image control processing corresponds to an example of second rectangular image control processing.

The image processing unit 44 includes an image generation unit 64. Based on the circumscribed correction information, the image generation unit 64 generates circumscribed image data from the read image data. Based on the inscribed correction information, the image generation unit 64 generates inscribed image data from the read image data. That is, based on the read image data and the circumscribed correction information, the control unit 40, which includes the image generation unit 64, generates the circumscribed image data. In addition, based on the read image data and the inscribed correction information, the control unit 40 generates the inscribed image data.

Specifically, for example, the image generation unit 64 acquires the correction angle, the circumscribed correction origin, and the circumscribed correction size as the circumscribed correction information. The circumscribed correction origin and the circumscribed correction size are the circumscribed correction information defined for the analysis image data having the second reading resolution. The image generation unit 64 converts the circumscribed correction origin and the circumscribed correction size that are defined for the analysis image data having the second reading resolution into the circumscribed correction origin and the circumscribed correction size that are defined for the read image data having the first reading resolution. Based on the circumscribed correction origin and the circumscribed correction size that are defined for the read image data and further based on the correction angle, the image generation unit 64 generates the circumscribed image data from the read image data. Similarly, based on the inscribed correction origin and the inscribed correction size that are defined for the read image data and further based on the correction angle, the image generation unit 64 generates the inscribed image data from the read image data.

The image processing unit 44 includes an image processing storage unit 70. The image processing storage unit 70 is comprised of storage areas for storing the image data processed by the image processing unit 44. The image processing storage unit 70 includes an acquired image storage unit 71, an analysis image storage unit 72, and a generated image storage unit 73. The acquired image storage unit 71 is a storage area for storing the image data acquired by the image acquisition unit 51. That is, the acquired image storage unit 71 stores the read image data. The analysis image storage unit 72 is a storage area for storing the analysis image converted by the analysis image conversion unit 52. The generated image storage unit 73 is a storage area for storing the image data generated by the image generation unit 64.

Inscribed Correction Coefficient Control Processing

Inscribed correction coefficient control processing will now be explained. The inscribed correction coefficient control processing includes inscribed correction coefficient input processing, which is performed at the terminal apparatus 100, and inscribed correction coefficient setting processing, which is performed at the image reading apparatus 11. The inscribed correction coefficient input processing is processing invoked in a predetermined cycle. The inscribed correction coefficient setting processing is processing invoked in a predetermined cycle.

At the terminal apparatus 100, in the inscribed correction coefficient input processing, based on an input signal from the terminal operation unit 102, the terminal control unit 101 determines whether there is an input of inscribed correction coefficient setting information or not. The inscribed correction coefficient setting information is information by which it is possible to detect that an inscribed correction coefficient is demanded to be set and identify the inscribed correction coefficient to be set. The terminal control unit 101 terminates the inscribed correction coefficient input processing when it is determined that the inscribed correction coefficient setting information is not inputted. The terminal control unit 101 outputs the inscribed correction coefficient setting information to the image reading apparatus 11 when it is determined that the inscribed correction coefficient setting information is inputted. Upon completion of this processing, the terminal control unit 101 terminates the inscribed correction coefficient input processing.

At the image reading apparatus 11, in the inscribed correction coefficient setting processing, the control unit 40 determines whether there is an input of the inscribed correction coefficient setting information from the terminal apparatus 100 or not. The control unit 40 terminates the inscribed correction coefficient setting processing when it is determined that the inscribed correction coefficient setting information is not inputted from the terminal apparatus 100. The control unit 40 sets an inscribed correction coefficient based on the inscribed correction coefficient setting information when it is determined that the inscribed correction coefficient setting information is inputted from the terminal apparatus 100. As described here, based on the input from the terminal operation unit 102, the control unit 40 is capable of adjusting the inscribed correction origin and the inscribed correction size of the inscribed image data. Upon completion of this processing, the control unit 40 terminates the inscribed correction coefficient setting processing.

Image Reading Control Processing

Next, with reference to FIG. 9, image reading control processing will now be explained. The image reading control processing includes first image reading control processing, which is performed at the image reading apparatus 11, and second image reading control processing, which is performed at the terminal apparatus 100. The first image reading control processing is processing invoked in a predetermined cycle. The second image reading control processing is processing invoked in a predetermined cycle.

Figure 9:
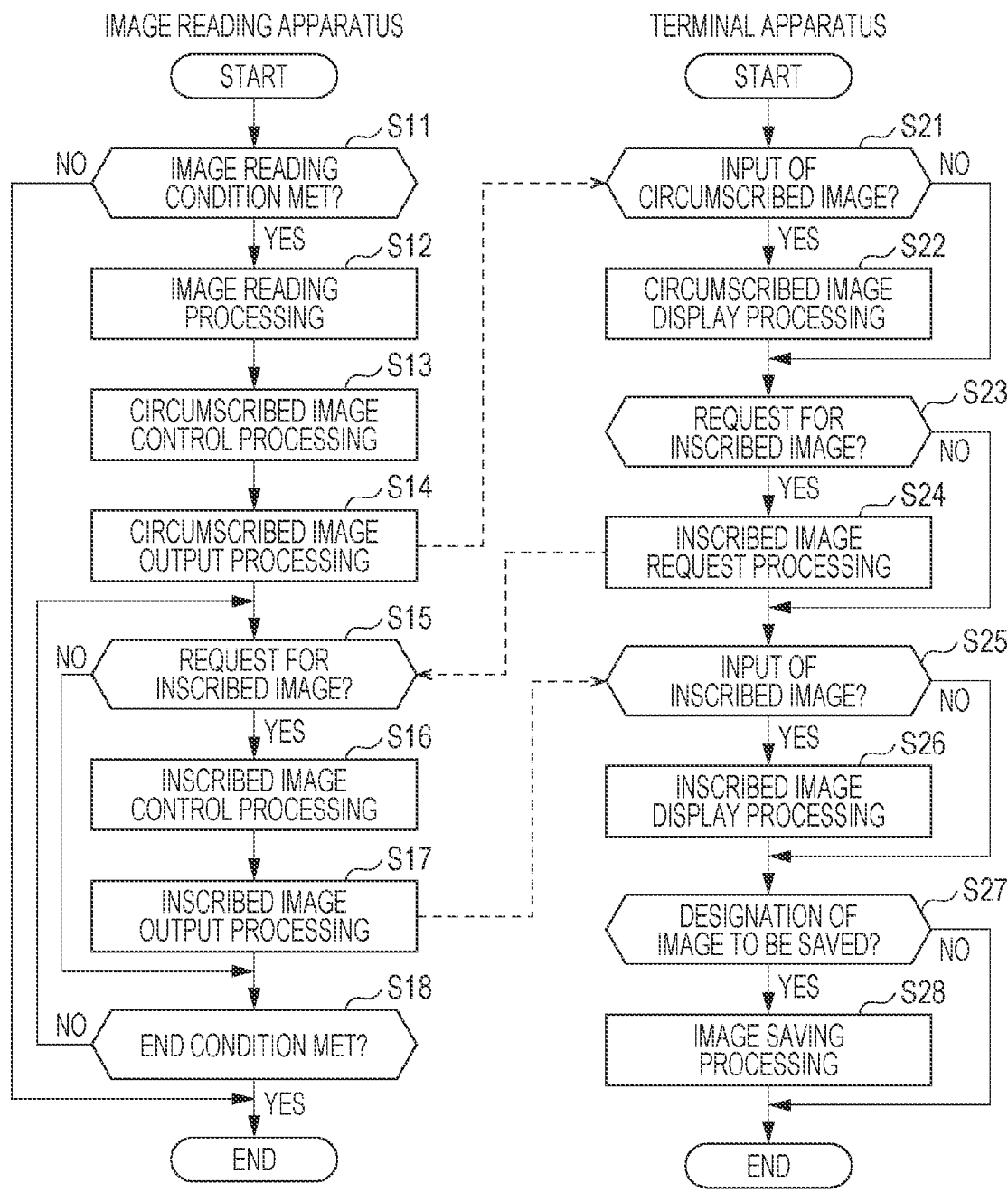
FIG. 9 is a flowchart illustrating image reading processing of the image reading system.

As illustrated in FIG. 9, at the image reading apparatus 11, in a step S11 of the first image reading control processing, the control unit 40 determines whether the image reading condition is met or not. The image reading condition can be met based on operation on the operation unit 17. The image reading condition can be met based on an input of image reading information from the terminal apparatus 100. The control unit 40 terminates the first image reading control processing when it is determined that the image reading condition is not met. The control unit 40 advances the process to a step S12 when it is determined that the image reading condition is met.

In the step S12, the control unit 40 performs image reading processing. In this processing, the control unit 40 controls the transportation mechanism 20 to cause it to transport the document D. The control unit 40 controls the reading unit 30 to cause it to read an image from the document D. Based on the pixel signals obtained by reading by the reading unit 30, the control unit 40 generates image data. Upon completion of this processing, the control unit 40 advances the process to a step S13.

In the step S13, the control unit 40 performs circumscribed image control processing. In this processing, the control unit 40 generates analysis image data from the image data. Based on the analysis image data, the control unit 40 acquires circumscribed image control data. More particularly, based on the analysis image data, the control unit 40 acquires border positions. Based on the border positions, the control unit 40 acquires a correction angle as the circumscribed image control data. In addition, based on the border positions and the correction angle, the control unit 40 acquires correction origin and correction size as the circumscribed image control data. Based on the circumscribed image control data, the control unit 40 generates circumscribed image data from the read image data. Upon completion of this processing, the control unit 40 advances the process to a step S14.

In the step S14, the control unit 40 performs circumscribed image output processing. In this processing, the control unit 40 outputs the generated circumscribed image data to the terminal apparatus 100. Upon completion of this processing, the control unit 40 advances the process to a step S15.

On the other hand, at the terminal apparatus 100, in a step S21 of the second image reading control processing, the terminal control unit 101 determines whether there is an input of the circumscribed image data from the image reading apparatus 11 or not. The terminal control unit 101 advances the process to a step S23 when it is determined that the circumscribed image data is not inputted. The terminal control unit 101 advances the process to a step S22 when it is determined that the circumscribed image data is inputted.

In the step S22, based on the inputted circumscribed image data, the terminal control unit 101 causes the terminal display unit 103 to display a circumscribed image. Upon completion of this processing, the terminal control unit 101 advances the process to the step S23.

In the step S23, based on operation on the terminal operation unit 102, the terminal control unit 101 determines whether there is a request for an inscribed image or not. The request for an inscribed image may be able to be inputted when the circumscribed image is displayed on the terminal display unit 103. As described here, at the terminal apparatus 100, the user is able to make a request for an inscribed image based on operation on the terminal operation unit 102 when the user wants the inscribed image to be displayed when the circumscribed image is displayed on the terminal display unit 103. The terminal control unit 101 advances the process to a step S25 when it is determined that an inscribed image is not requested. The terminal control unit 101 advances the process to a step S24 when it is determined that an inscribed image is requested.

In the step S24, the terminal control unit 101 outputs the request for an inscribed image to the image reading apparatus 11. Upon completion of this processing, the terminal control unit 101 advances the process to the step S25.

At the image reading apparatus 11, in the step S15 of the first image reading control processing, the control unit 40 determines whether there is a request for an inscribed image from the terminal apparatus 100 or not. The control unit 40 advances the process to a step S18 when it is determined that an inscribed image is not requested. The control unit 40 advances the process to a step S16 when it is determined that an inscribed image is requested.

In the step S16, the control unit 40 performs inscribed image control processing. In this processing, based on the circumscribed image control data, the control unit 40 acquires inscribed image control data. More particularly, based on the border positions, and the correction angle as the circumscribed image control data, the control unit 40 acquires a plurality of reference positions. The control unit 40 acquires an inscribed correction coefficient. Based on the plurality of reference positions and the inscribed correction coefficient, the control unit 40 acquires differences between the circumscribed image and the inscribed image. Based on the circumscribed image control data and the differences between the circumscribed image and the inscribed image, the control unit 40 acquires inscribed correction origin and inscribed correction size as the inscribed image control data. Based on the correction angle, the inscribed correction origin, and the inscribed correction size, the control unit 40 generates inscribed image data from the read image data. As described here, based on the input from the terminal operation unit 102, the control unit 40 is capable of selecting whether to generate inscribed image data or not. Upon completion of this processing, the control unit 40 advances the process to a step S17.

In the step S17, the control unit 40 performs inscribed image output processing. In this processing, the control unit 40 outputs the generated inscribed image data to the terminal apparatus 100. Upon completion of this processing, the control unit 40 advances the process to the step S18.

In the step S18, the control unit 40 determines whether an end condition for terminating the image reading is met or not. The end condition for terminating the image reading may be met based on operation on the operation unit 17. The end condition for terminating the image reading may be met based on an input of image reading end information from the terminal apparatus 100. The end condition for terminating the image reading may be met based on the outputting of the inscribed image data. The end condition for terminating the image reading may be met upon a lapse of pre-determined time. The control unit 40 returns the process to the step S15 when it is determined that the end condition for terminating the image reading is not met. The control unit 40 terminates the first image reading control processing when it is determined that the end condition for terminating the image reading is met. Because of this process loop, the control unit 40 determines repeatedly whether there is a request for an inscribed image or not until the end condition for terminating the image reading is met.

On the other hand, at the terminal apparatus 100, in the step S25 of the second image reading control processing, the terminal control unit 101 determines whether there is an input of the inscribed image data from the image reading apparatus 11 or not. The terminal control unit 101 advances the process to a step S27 when it is determined that the inscribed image data is not inputted. The terminal control unit 101 advances the process to a step S26 when it is determined that the inscribed image data is inputted.

In the step S26, based on the inputted inscribed image data, the terminal control unit 101 causes the terminal display unit 103 to display an inscribed image. Upon completion of this processing, the terminal control unit 101 advances the process to the step S27.

In the step S27, based on operation on the terminal operation unit 102, the terminal control unit 101 determines whether an image to be saved is designated or not. The system may be configured such that an input for designating the image to be saved can be made when either one of the circumscribed image and the inscribed image is, or both are, displayed on the terminal display unit 103. More particularly, the system may be configured such that the circumscribed image can be designated as the image to be saved when either one of the circumscribed image and the inscribed image is, or both are, displayed on the terminal display unit 103. The system may be configured such that the inscribed image can be designated as the image to be saved when the inscribed image is displayed on the terminal display unit 103. The terminal control unit 101 terminates the second image reading control processing when it is determined that the image to be saved is not designated. The terminal control unit 101 advances the process to a step S28 when it is determined that the image to be saved is designated.

In the step S28, the terminal control unit 101 stores the designated image into a memory. By this means, at the terminal apparatus 100, based on operation on the terminal operation unit 102, it is possible to save the designated one of the circumscribed image and the inscribed image. The terminal control unit 101 may output image reading end information to the image reading apparatus 11. Upon completion of this processing, the terminal control unit 101 terminates the second image reading control processing.

As described here, the terminal control unit 101 is capable of executing display control processing of causing the terminal display unit 103 to display the inscribed image, based on the input from the terminal operation unit 102, after causing the terminal display unit 103 to display the circumscribed image. In other words, the control unit 40 is capable of executing display control processing of performing control for causing the terminal display unit 103 to display the inscribed image, based on the input from the terminal operation unit 102, after performing control for causing the terminal display unit 103 to display the circumscribed image.

Operation of First Embodiment

Operation of the first embodiment will now be explained.

At the image reading apparatus 11, pixel signals are inputted from the first image sensor 32A and the second image sensor 32B into the control unit 40 via the analog front end. In the control unit 40, read image data that is based on the pixel signals is acquired. Based on the read image data, analysis image data is acquired.

Based on the analysis image data, the vertex positions C1 to C4 of the document area R2 within the reading area R1 are acquired. Based on the analysis image data, the border positions B10, B20, B30, and B40 of the document area R2 are acquired. Based on the vertex positions C1 to C4 and the border positions B10, B20, B30, and B40, the correction angles $\theta 1$ and $\theta 2$ of the read image data are acquired as circumscribed image control data. Based on the vertex positions C1 to C4, the border positions B10, B20, B30, and B40, and the correction angles $\theta 1$ and $\theta 2$, circumscribed correction origin and circumscribed correction size are acquired as the circumscribed image control data. Based on the circumscribed image control data, circumscribed image data is generated from the read image data. Then, a circumscribed image that is based on the circumscribed image data is displayed on the terminal display unit 103.

When it is determined based on an input from the terminal operation unit 102 that there is a request for an inscribed image, based on the vertex positions C1 to C4 of the document area R2 and the border positions B10, B20, B30, and B40 thereof, reference positions are acquired. An inscribed correction coefficient set based on the input from the terminal operation unit 102 is acquired. Based on the reference positions and the inscribed correction coefficient, differences between the circumscribed image and the inscribed image are acquired. Based on the circumscribed correction origin and the circumscribed correction size as the circumscribed image control data, and further based on the differences between the circumscribed image and the inscribed image, inscribed correction origin and inscribed correction size as inscribed image control data are acquired. Based on the inscribed image control data, inscribed image data is generated from the read image data. Then, an inscribed image that is based on the inscribed image data is displayed on the terminal display unit 103.

Effects of First Embodiment

Effects of the first embodiment will now be explained.

(1) Based on read image data, circumscribed image control data regarding generation of circumscribed image data that includes the whole of the document area R2 corresponding to the document D within the reading area R1 is acquired. Based on the circumscribed image control data, inscribed image control data regarding generation of inscribed image data that does not include the background area R3 not corresponding to the document D within the reading area R1 and includes at least a part of the document area R2 is acquired. For this reason, not only the circumscribed image control data regarding the generation of the circumscribed image data that includes the whole of the document area R2 corresponding to the document D but also the inscribed image control data regarding the generation of the inscribed image data that does not include the background area R3 can be acquired. Therefore, it is possible to enhance user friendliness.

(2) The correction angles θ1 and θ2 of the read image data are acquired as the circumscribed image control data. Based on the correction angles θ1 and θ2 of the read image data, inscribed correction origin and inscribed correction size for correcting the read image data are acquired as the inscribed image control data. For this reason, it is possible to acquire the inscribed correction origin and the inscribed correction size that are based on the correction angles θ1 and θ2 of the read image data. Therefore, it is possible to acquire the inscribed image control data while taking the correction angles θ1 and θ2 of the read image data into consideration. Though the correction angles θ1 and θ2 of the read image data are acquired as the circumscribed image control data, they can be used also when acquiring the inscribed image control data, and it is possible to increase the speed of control for acquiring the inscribed image control data.

(3) Each of the sides E11 to E14 that are based on the vertex positions C1 to C4 of the document area R2 includes the range RY11, RY13, RX21, RX23, which is within the distance DY1, DX1 from the vertex position C1 to C4 of the document area R2. For each of the sides E11 to E14 that are based on the vertex positions C1 to C4 of the document area R2, based on plural reference positions that are not included in the range RY11, RY13, RX21, RX23, correction origin and correction size for correcting the read image data into the inscribed image control data are acquired. For this reason, even when any of the vertex positions C1 to C4 is missing, it is possible to acquire the correction origin and the correction size based on the plural reference positions that are not included in the range RY11, RY13, RX21, RX23, which is within the distance DY1, DX1 from the vertex position C1 to C4. Therefore, by acquiring appropriate inscribed image control data from the circumscribed image control data, it is possible to generate inscribed image data without a decrease in quality.

(4) Based on an input from the terminal operation unit 102, it is possible to select whether to generate inscribed image data or not. For this reason, the selection as to whether to generate inscribed image data or not can be made as the user intends. Therefore, it is possible to enhance user friendliness.

(5) Based on an input from the terminal operation unit 102, it is possible to adjust an inscribed correction coefficient. For this reason, the inscribed correction coefficient is adjustable as the user intends. Therefore, it is possible to enhance user friendliness.

(6) The resolution of the read image data is converted into the second reading resolution, which is lower than the first reading resolution, when the read image data has the first reading resolution. The image data whose reading resolution has been converted into the second reading resolution is converted into binary image data. Based on the binary image data, the circumscribed image control data is acquired. For this reason, it is possible to make the reading resolution of the read image data low, and it is possible to use the read image data as the binary image data. Therefore, it is possible to increase the speed of control for acquiring the circumscribed image control data.

(7) After control for displaying a circumscribed image is performed, based on an input from the terminal operation unit 102, control for displaying an inscribed image is performed. For this reason, it is possible to provide an opportunity for allowing the user to confirm the circumscribed image by displaying the circumscribed image. Then, after the confirmation of the circumscribed image, it is possible to provide an opportunity for allowing the user to input a demand for displaying an inscribed image. Therefore, it is possible to enhance user friendliness.

Modification Examples

The present embodiment may be modified as described below. The present embodiment and the following modification examples may be combined with one another as long as they are not technically contradictory to one another.

In the foregoing embodiment, for example, whether to display the circumscribed image or to display the inscribed image may be selectable based on an input of instructions by the user. In other words, whether to generate the circumscribed image data or to generate the inscribed image data may be selectable based on an input of instructions by the user. That is, the control unit 40 may be configured to be able to select whether or not to execute either one, or both, of the circumscribed image control processing and the inscribed image control processing, based on an input from the terminal operation unit 102 of the terminal apparatus 100. For example, user instructions may be able to be inputted each time the image reading condition is met. Alternatively, for example, user instructions may be able to be inputted before the image reading condition is met, and the selection result may be kept set continuously.

In the foregoing embodiment, for example, with regard to the analysis image data, the conversion of the resolution of the read image data is not always necessary. For example, with regard to the analysis image data, the read image data does not necessarily have to be converted into binary image data. For example, the read image data may be analyzed, without acquiring the analysis image data.

In the foregoing embodiment, for example, based on the analysis result of the circumscribed image data, the inscribed image data may be generated from the circumscribed image data. That is, in the inscribed image control processing, the correction value for correcting the read image data or the circumscribed image data may be acquired as the inscribed image control data.

In the foregoing embodiment, for example, the correction angle acquisition unit 58 may acquire a plurality of correction-angle candidates and acquire any one as the correction angle from among the plurality of correction-angle candidates. The plurality of correction-angle candidates may include a reference angle, which is acquired in the same manner as done in the foregoing embodiment, an angle obtained by adding a first angle to the reference angle, an angle obtained by subtracting the first angle from the reference angle, an angle obtained by adding a second angle to the reference angle, and an angle obtained by subtracting the second angle from the reference angle. The correction angle acquisition unit 58 may acquire, as the correction angle, an angle that minimizes the area size of the background area R3 as the result of rotation of the document area R2 by each of the plurality of correction-angle candidates.

In the foregoing embodiment, the inscribed image data may be generated regardless of an input from the terminal operation unit 102. In addition, whether to display the inscribed image or not may be selectable based on an input from the terminal operation unit 102.

In the foregoing embodiment, various instructions may be given not based on inputs from the terminal operation unit 102 of the terminal apparatus 100 but based on inputs from the operation unit 17 of the image reading apparatus 11. Various instructions may include instructions for inputting an inscribed correction coefficient. Various instructions may include instructions for generating inscribed image data. Various instructions may include instructions for inputting an inscribed image.

In the foregoing embodiment, the circumscribed image and the inscribed image may be displayed not on the terminal display unit 103 of the terminal apparatus 100 but on the display unit of the image reading apparatus 11. As described here, the control unit 40 may correspond to an example of a control unit, or the control unit 40 and the terminal control unit 101 may correspond to an example of a control unit. The image reading system 10 may be configured to include the terminal apparatus 100 or not include the terminal apparatus 100.

The first image sensor 32A and the second image sensor 32B are not limited to CMOS image sensors. The first image sensor 32A and the second image sensor 32B may be, for example, metal oxide semiconductor (MOS) image sensors. The first image sensor 32A and the second image sensor 32B may be, for example, charge coupled device (CCD) image sensors.

The first image sensor 32A and the second image sensor 32B are not limited to linear image sensors. The first image sensor 32A and the second image sensor 32B may be, for example, area image sensors.

The material of the document is not limited to paper. For example, the material of the document may be a resin film, a resin sheet, fabric, a metal film, or the like.

The image reading apparatus may be a part of a multi-function peripheral that has a print function and a copy function in addition to a scan function.

The image reading apparatus is not limited to a sheet-feed-type apparatus. The image reading apparatus may be a flat-bed-type apparatus. A flat-bed image reading apparatus includes a carriage and a carriage motor. Driven by the carriage motor, the carriage is capable of moving in the main-scan direction X. A reading unit is mounted on the carriage.

The disclosed technique can be applied to an image reading apparatus. The disclosed technique can be applied also to an image reading system and a method for controlling an image reading apparatus.

Additional Remarks

Technical concepts that will be understood from the foregoing embodiment and modification examples, and the operational effects thereof, are described below.

(A) An image reading apparatus includes: a reading unit that reads an image from a document; and a control unit that performs control regarding image reading, wherein the control unit is configured to execute first image data generation processing of, based on read image data of the image read by the reading unit, generating first rectangular image data that includes a whole of a document area corresponding to the document within a reading area of the read image data, first rectangular image control processing of acquiring first control data regarding generation of the first rectangular image data, second image data generation processing of, based on the first control data, generating second rectangular image data that does not include a background area not corresponding to the document within the reading area of the read image data and includes at least a part of the document area, and second rectangular image control processing of acquiring second control data regarding generation of the second rectangular image data.

With this configuration, it is possible to acquire not only the first control data regarding the generation of the first rectangular image data, which includes the whole of the document area corresponding to the document, but also the second control data regarding the generation of the second rectangular image data, which does not include the background area. Therefore, it is possible to enhance user friendliness.

(B) In the first rectangular image control processing, the control unit may acquire an angle of inclination of the read image data as the first control data, and in the second rectangular image control processing, based on the angle of inclination of the read image data, the control unit may acquire a correction value for correcting the read image data or the first rectangular image data as the second control data.

With this configuration, it is possible to acquire a correction value that is based on the angle of inclination of the read image data. Therefore, it is possible to acquire the second control data while taking the angle of inclination of the read image data into consideration. Though the angle of inclination of the read image data is acquired as the first control data, it can be used also when acquiring the second control data, and it is possible to increase the speed of control for acquiring the second control data.

(C) Each of sides that are based on corners of the document area may include a first range that is within a first distance from a corner among the corners of the document area, and in the second rectangular image control processing, for the each of the sides that are based on the corners of the document area, based on a plurality of reference positions not included in the first range, the control unit may acquire a correction value for correcting the read image data or the first rectangular image data.

With this configuration, even when a corner of the document is missing due to, for example, a tear, a fold, a cut, or the like, it is possible to acquire the correction value, based on the plurality of reference positions not included in the first range, which is within the first distance from the corner of the document. Therefore, by acquiring appropriate second control data from the first control data, it is possible to generate the second rectangular image data without a decrease in quality.

(D) Each of the sides that are based on the corners of the document area may include a second range that is a range from "a position located at the first distance from the corner of the document area" to "a position located at a second distance from the position located at the first distance", and the plurality of reference positions may be included in the second range. This configuration produces effects that are similar to those of (C).

(E) The image reading apparatus may further include: an input unit to which instructions given by a user are configured to be inputted, wherein, based on an input from the input unit, the control unit may be configured to select whether or not to generate the second rectangular image data.

This configuration enables the selection as to whether to generate the second rectangular image data or not as the user intends. Therefore, it is possible to enhance user friendliness.

(F) The image reading apparatus may further include: an input unit to which instructions given by a user are configured to be inputted, wherein, based on an input from the input unit, in the second rectangular image control processing, the control unit may be configured to adjust a correction value for correcting the read image data or the first rectangular image data.

With this configuration, the correction value for correcting the read image data or the first rectangular image data can be adjusted as the user intends. Therefore, it is possible to enhance user friendliness.

The control unit may be configured to execute resolution conversion processing of converting a resolution of the read image data into a second reading resolution, which is lower than a first reading resolution, when the read image data has the first reading resolution, and binary image conversion processing of converting image data whose resolution has been converted into the second reading resolution into binary image data, and, in the first rectangular image control processing, based on the binary image data, the control unit may acquire the first control data.

With this configuration, it is possible to make the reading resolution of the read image data low, and it is possible to use the read image data as the binary image data. Therefore, it is possible to increase the speed of control for acquiring the first control data.

(H) An image reading system includes: a reading unit that reads an image from a document; a control unit that performs control regarding image reading; a display unit that performs image display; and an input unit to which instructions given by a user are configured to be inputted, wherein the control unit is configured to execute first image data generation processing of, based on read image data of the image read by the reading unit, generating first rectangular image data that includes a whole of a document area corresponding to the document within a reading area of the read image data, first rectangular image control processing of acquiring first control data regarding generation of the first rectangular image data, second image data generation processing of, based on the first control data, generating second rectangular image data that does not include a background area not corresponding to the document within the reading area of the read image data and includes at least a part of the document area, second rectangular image control processing of acquiring second control data regarding generation of the second rectangular image data, and display control processing of performing control for causing the display unit to display a second rectangular image that is based on the second rectangular image data, based on an input from input unit, after performing control for causing the display unit to display a first rectangular image that is based on the first rectangular image data.

This configuration produces effects that are similar to those of (A). In addition, by displaying the first rectangular image, it is possible to provide an opportunity for allowing the user to confirm the first rectangular image. Then, after the confirmation of the first rectangular image, it is possible to provide an opportunity for allowing the user to input a demand for displaying the second rectangular image. Therefore, it is possible to enhance user friendliness.

(I) A method for controlling an image reading apparatus that includes a reading unit that reads an image from a document is provided. The method includes: generating, based on read image data of the image read by the reading unit, first rectangular image data that includes a whole of a document area corresponding to the document within a reading area of the read image data; acquiring first control data regarding generation of the first rectangular image data; generating, based on the first control data, second rectangular image data that does not include a background area not corresponding to the document within the reading area of the read image data and includes at least a part of the document area; and acquiring second control data regarding generation of the second rectangular image data. This method produces effects that are similar to those of (A).

What is claimed is:

1. An image reading apparatus, comprising:
a reading unit that reads an image from a document; and
a control unit that performs control regarding image reading, wherein
the control unit is configured to execute
first image data generation processing of, based on read image data of the image read by the reading unit, generating first rectangular image data that includes a whole of a document area corresponding to the document within a reading area of the read image data,
first rectangular image control processing of acquiring first control data regarding generation of the first rectangular image data,
second image data generation processing of, based on the first control data, generating second rectangular image data that does not include a background area not corresponding to the document within the reading area of the read image data and includes at least a part of the document area, and
second rectangular image control processing of acquiring second control data regarding generation of the second rectangular image data.

2. The image reading apparatus according to claim 1, wherein
in the first rectangular image control processing, the control unit acquires an angle of inclination of the read image data as the first control data, and
in the second rectangular image control processing, based on the angle of inclination of the read image data, the control unit acquires a correction value for correcting the read image data or the first rectangular image data as the second control data.

3. The image reading apparatus according to claim 1, wherein
each of sides that are based on corners of the document area includes a first range that is within a first distance from a corner among the corners of the document area, and
in the second rectangular image control processing, for the each of the sides that are based on the corners of the document area, based on a plurality of reference positions not included in the first range, the control unit acquires a correction value for correcting the read image data or the first rectangular image data.

4. The image reading apparatus according to claim 3, wherein
the each of the sides that are based on the corners of the document area includes a second range that is a range from a position located at the first distance from the corner of the document area to a position located at a second distance from the position located at the first distance, and
the plurality of reference positions is included in the second range.

5. The image reading apparatus according to claim 1, further comprising:
an input unit to which instructions given by a user are configured to be inputted, wherein
based on an input from the input unit, the control unit is configured to select whether or not to generate the second rectangular image data.

6. The image reading apparatus according to claim 1, further comprising:
an input unit to which instructions given by a user are configured to be inputted, wherein
based on an input from the input unit, the control unit is configured to select whether to generate the first rectangular image data or to generate the second rectangular image data.

7. The image reading apparatus according to claim 1, further comprising:
an input unit to which instructions given by a user are configured to be inputted, wherein
based on an input from the input unit, in the second rectangular image control processing, the control unit is configured to adjust a correction value for correcting the read image data or the first rectangular image data.

8. The image reading apparatus according to claim 1, wherein
the control unit is configured to execute
resolution conversion processing of converting a resolution of the read image data into a second reading resolution, which is lower than a first reading resolution, when the read image data has the first reading resolution, and
binary image conversion processing of converting image data whose resolution has been converted into the second reading resolution into binary image data, and
in the first rectangular image control processing, based on the binary image data, the control unit acquires the first control data.

9. An image reading system, comprising:
a reading unit that reads an image from a document;
a control unit that performs control regarding image reading;
a display unit that performs image display; and
an input unit to which instructions given by a user are configured to be inputted, wherein
the control unit is configured to execute
first image data generation processing of, based on read image data of the image read by the reading unit, generating first rectangular image data that includes a whole of a document area corresponding to the document within a reading area of the read image data,
first rectangular image control processing of acquiring first control data regarding generation of the first rectangular image data,
second image data generation processing of, based on the first control data, generating second rectangular image data that does not include a background area not corresponding to the document within the reading area of the read image data and includes at least a part of the document area,
second rectangular image control processing of acquiring second control data regarding generation of the second rectangular image data, and
display control processing of performing control for causing the display unit to display a second rectangular image that is based on the second rectangular image data, based on an input from input unit, after performing control for causing the display unit to display a first rectangular image that is based on the first rectangular image data.

10. A method for controlling an image reading apparatus that includes a reading unit that reads an image from a document, comprising:
generating, based on read image data of the image read by the reading unit, first rectangular image data that includes a whole of a document area corresponding to the document within a reading area of the read image data;
acquiring first control data regarding generation of the first rectangular image data;
generating, based on the first control data, second rectangular image data that does not include a background area not corresponding to the document within the reading area of the read image data and includes at least a part of the document area; and
acquiring second control data regarding generation of the second rectangular image data.

\* \* \* \* \*